United States Patent
Chen et al.

(10) Patent No.: US 11,995,269 B2
(45) Date of Patent: May 28, 2024

(54) TOUCH SENSING APPARATUS WITH NOISE REDUCTION AND ELECTRONIC DEVICE INCLUDING THE SAME

(71) Applicant: NOVATEK MICROELECTRONICS CORP., Hsinchu (TW)

(72) Inventors: Hung-Kai Chen, Taipei (TW); Yu-Huang Chen, Tainan (TW); Feng-Lin Chan, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/123,672

(22) Filed: Mar. 20, 2023

(65) Prior Publication Data

US 2023/0229263 A1 Jul. 20, 2023

Related U.S. Application Data

(62) Division of application No. 17/330,058, filed on May 25, 2021, now Pat. No. 11,635,853.

(Continued)

(51) Int. Cl.
*G06F 3/041* (2006.01)
*G06F 3/044* (2006.01)

(52) U.S. Cl.
CPC ........ *G06F 3/04184* (2019.05); *G06F 3/0412* (2013.01); *G06F 3/04164* (2019.05); *G06F 3/0446* (2019.05)

(58) Field of Classification Search
CPC ............... G06F 3/04184; G06F 3/0412; G06F 3/04164; G06F 3/0446; G06F 3/04166; G06F 3/044
See application file for complete search history.

(56) References Cited

U.S. PATENT DOCUMENTS

| 10,592,055 | B2 | 3/2020 | Lee et al. |
| 2010/0060610 | A1 | 3/2010 | Wu |

(Continued)

FOREIGN PATENT DOCUMENTS

| CN | 101446721 A | 1/2011 |
| CN | 102053765 A | 5/2011 |

(Continued)

OTHER PUBLICATIONS

U.S. Appl. No. 17/330,058, filed May 26, 2021.
U.S. Office Action for U.S. Appl. No. 17/331,197, dated Jun. 2, 2022.

*Primary Examiner* — Liliana Cerullo
(74) *Attorney, Agent, or Firm* — MARSHALL, GERSTEIN & BORUN LLP

(57) ABSTRACT

A touch sensing method, apparatus for a touch panel, and electronic device are provided. The method includes: determining a first number of to-sense touch sensing circuits, and determining a second number of reference touch sensing circuits, each to-sense touch sensing circuit having a corresponding reference touch sensing circuit; causing each to-sense touch sensing circuit to receive a touch excitation signal TX1, and apply TX1 to a corresponding touch sensitive cell and receive a touch sensing signal therefrom, and output a first output signal; causing each reference touch sensing circuit to receive a touch reference signal DC/TX2, and apply DC/TX2 to a corresponding touch sensitive cell and receive a reference sensing signal therefrom, wherein DC/TX2 and TX1 are different signals; and obtaining, according to respective first and second output signals, a capacitance difference of capacitances sensed by each to-sense touch sensing circuit and its corresponding reference touch sensing circuit.

16 Claims, 11 Drawing Sheets

Related U.S. Application Data

(60) Provisional application No. 63/030,317, filed on May 27, 2020.

(56) References Cited

U.S. PATENT DOCUMENTS

| | | |
|---|---|---|
| 2013/0093720 A1 | 4/2013 | Liu et al. |
| 2013/0300690 A1 | 11/2013 | Yang et al. |
| 2015/0002445 A1 | 1/2015 | Brunet et al. |
| 2016/0291766 A1 | 10/2016 | Shen et al. |
| 2017/0205933 A1 | 7/2017 | Kwon et al. |
| 2018/0307337 A1 | 10/2018 | Ahn |
| 2019/0050087 A1 | 2/2019 | Chandran et al. |
| 2019/0079124 A1 | 3/2019 | Jiang et al. |
| 2020/0103993 A1 | 4/2020 | Krah et al. |
| 2021/0255735 A1 | 8/2021 | Gray et al. |

FOREIGN PATENT DOCUMENTS

| | | |
|---|---|---|
| CN | 102346597 A | 2/2012 |
| CN | 101937662 A | 11/2014 |
| CN | 104182099 A | 12/2014 |
| CN | 104769536 A | 7/2015 |
| CN | 104834406 A | 8/2015 |
| CN | 102650917 A | 12/2015 |
| CN | 107820570 A | 3/2018 |
| CN | 108874205 A | 11/2018 |
| CN | 108874210 A | 11/2018 |
| CN | 109144305 A | 1/2019 |
| CN | 106990873 A | 6/2019 |
| CN | 110096181 A | 8/2019 |
| CN | 110389678 A | 10/2019 |
| CN | 110609636 A | 12/2019 |

TOUCH SENSING APPARATUS WITH NOISE REDUCTION AND ELECTRONIC DEVICE INCLUDING THE SAME

CROSS-REFERENCE TO RELATED APPLICATIONS

This application is a divisional application of U.S. patent application Ser. No. 17/330,058, filed on May 25, 2021, which claims the priority to and benefits of U.S. Provisional Application No. 63/030,317 filed on May 27, 2020 in the United States Patent and Trademark Office, the disclosure of which is incorporated by reference herein in its entirety.

TECHNICAL FIELD

The present disclosure relates to a field of circuits, and more specifically, to a touch sensing method for a touch panel, a touch sensing apparatus for a touch panel, and an electronic device.

BACKGROUND

For traditional panels that integrate touching, displaying, or fingerprint recognizing, respective circuits used to drive touch sensing (touching), displaying, or fingerprint recognizing cannot avoid interference with each other, which affects the effect of touch sensing. A traditional solution may be, for example, time-division driving of respective circuits for driving touch sensing (touching), displaying, or fingerprint recognizing to avoid interference with each other. However, for display panels that integrate organic light-emitting diodes (OLEDs)/or Mini LEDs, etc. (i.e., integrated panels), since the display driving cannot be stopped, it is difficult to achieve time-division driving, that is, operations on a display panel will always bring noise to the touch sensing. Or, it is currently possible to use analog or digital filters in touch sensing circuits to increase sampling time, so as to improve the accuracy of touch sensing, but this method requires more power consumption.

Therefore, there is a need for a solution that may reduce the influence of noise caused by displaying and fingerprint recognizing and other operations on the touch sensing of the touch panel.

SUMMARY OF THE DISCLOSURE

According to an aspect of the present disclosure, there is provided a touch sensing method for a touch panel, the touch panel including a plurality of touch sensitive cells, and the touch sensing method includes: determining at least one touch sensing circuit of a plurality of touch sensing circuits as a first number of to-sense touch sensing circuits, and determining at least one touch sensing circuit of the plurality of touch sensing circuits as a second number of reference touch sensing circuits, and each touch sensing circuit has a corresponding touch sensitive cell, and each to-sense touch sensing circuit has a corresponding reference touch sensing circuit; causing a first terminal of each to-sense touch sensing circuit to receive a touch excitation signal (TX1), and a second terminal thereof to apply the touch excitation signal (TX1) to a corresponding touch sensitive cell and receive a touch sensing signal from the corresponding touch sensitive cell, and an output terminal thereof to output a first output signal; causing a first terminal of each reference touch sensing circuit to receive a touch reference signal (DC/TX2), and a second terminal thereof to apply the touch reference signal (DC/TX2) to a corresponding touch sensitive cell and receive a reference sensing signal from the corresponding touch sensitive cell, and an output terminal thereof to output a second output signal, the touch reference signal (DC/TX2) and the touch excitation signal (TX1) being different signals; and obtaining, according to the first number of first output signals and the second number of second output signals, a capacitance difference between the capacitances sensed by each to-sense touch sensing circuit and the corresponding reference touch sensing circuit.

According to another aspect of the present disclosure, there is also provided a touch sensing apparatus for a touch panel, the touch panel including a plurality of touch sensitive cells, and the touch sensing apparatus comprises: a plurality of touch sensing circuits and a plurality of operation units in an one-to-one correspondence, among which, at least one touch sensing circuit is used as a first number of to-sense touch sensing circuits, at least one touch sensing circuit is used as a second number of reference touch sensing circuits, each touch sensing circuit has a corresponding touch sensitive cell, and each to-sense touch sensing circuit has a corresponding reference touch sensing circuit; a first terminal of each to-sense touch sensing circuit receives a touch excitation signal (TX1), and a second terminal thereof applies the touch excitation signal (TX1) to the corresponding touch sensitive cell and receives a touch sensing signal from the corresponding touch sensitive cell, and an output terminal thereof outputs a first output signal; a first terminal of each reference touch sensing circuit receives a touch reference signal (DC/TX2), and a second terminal thereof applies the touch reference signal (DC/TX2) to the corresponding touch sensitive cell and receives a reference sensing signal from the corresponding touch sensitive cell, and an output terminal thereof outputs a second output signal, the touch reference signal (DC/TX2) and the touch excitation signal (TX1) being different signals; and the plurality of operation units calculate, according to the first number of first output signal and the second number of second output signal, a differential signal between the output signals of each to-sense touch sensing circuit and the corresponding reference touch sensing circuit, the differential signal being associated with a capacitance difference of capacitances sensed by the to-sense touch sensing circuit and the corresponding reference touch sensing circuit.

According to yet another aspect of the present disclosure, there is also provided a touch sensing method for a touch panel, the touch panel including a plurality of touch sensitive cells. The method includes: determining at least one touch sensing circuit of a plurality of touch sensing circuits as at least one to-sense touch sensing circuit, and determining at least one touch sensing circuit of the plurality of touch sensing circuits as at least one reference touch sensing circuit, each touch sensing circuit having a corresponding touch sensitive cell, and each to-sense touch sensing circuit has a corresponding reference touch sensing circuit; transmitting by each to-sense touch sensing circuit, a touch excitation signal to the corresponding touch sensitive cell, and obtaining at least one touch sensing signal; transmitting, by each reference touch sensing circuit, a touch reference signal to the corresponding touch sensitive cell, and obtaining at least one reference sensing signal, the touch reference signal and the touch excitation signal being different signals; obtaining at least one sensing signal according to the at least one reference sensing signal and the at least one touch sensing signal; and obtaining, according to the at least one sensing signal, capacitance differences between capacitances sensed by the at least one to-sense touch sensing circuit and the at least one reference touch sensing circuit.

According to yet another aspect of the present disclosure, there is also provided an electronic device comprising: a touch panel, the touch sensing apparatus for the touch panel as described above, and a controller configured to determine a touch position based on a signal output by the touch sensing apparatus.

In order to make the features and advantages of the present disclosure as described above more comprehensible, embodiments are listed below and are described in detail with reference to the accompanying drawings.

BRIEF DESCRIPTION OF THE DRAWINGS

The accompanying drawings are used to provide a further understanding of embodiments of the present disclosure, and constitute a part of the specification, and are used to explain the present disclosure together with the embodiments of the present disclosure, and do not constitute a limitation to the present disclosure. Throughout the accompanying drawings, the same reference numerals generally represent the same/similar components or steps.

DESCRIPTION OF THE EMBODIMENTS

Figure 1:
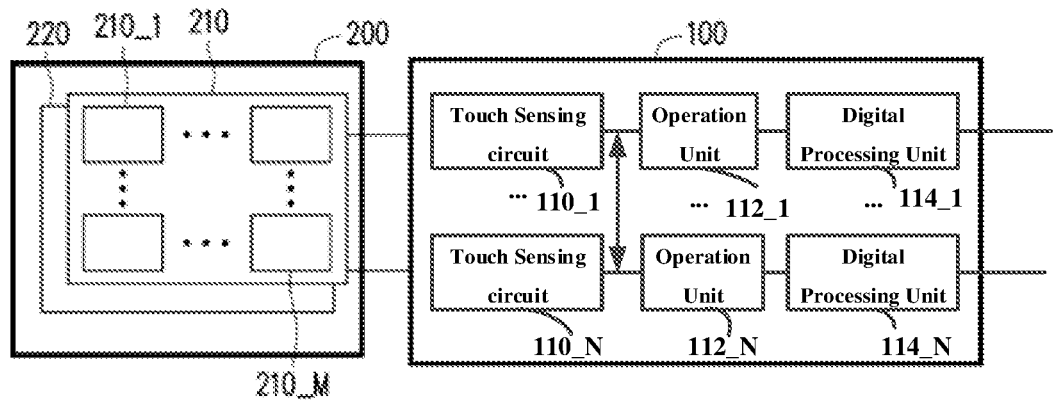
FIG. 1 shows a schematic diagram of a touch sensing apparatus and a touch-and-display panel according to the embodiments of the present disclosure.

The term "coupled (or connected)" used in the full specification of this disclosure (including the claims) may refer to any direct or indirect connection means. For example, if it is described in the specification that a first device is coupled (or connected) to a second device, it should be interpreted as that the first device may be directly connected to the second device, or the first device may be indirectly connected to the second device through another device or some kind of connection means. The terms "first" and "second" and so on mentioned in the full specification of this disclosure (including the claims) are used to name the element (element), or to distinguish different embodiments or scopes, and are not used to limit the upper or lower limit of the number of elements, nor are not used to limit the order of the elements. In addition, wherever possible, elements/members/steps with the same reference signs in the accompanying drawings and implementations represent the same or similar parts. Elements/members/steps using the same reference numerals or using the same terms in different embodiments may mutually refer to relevant descriptions. An expression used in the singular may encompass the expression of the plural, and an expression used in the plural may also encompass the expression of the singular, unless it has been clearly defined in the context.

FIG. 1 is a schematic diagram of a touch sensing apparatus and a touch-and-display panel according to embodiments of the present disclosure.

Referring to FIG. 1, a touch sensing apparatus 100 is coupled to a touch-and-display panel 200, and the touch-and-display panel 200 is integrated with a touch panel 210 and a display panel 220. The touch panel 210 includes a plurality of touch sensitive cells 210_1 to 210_M, where M is a positive integer.

According to some embodiments, the touch sensitive cells 210_1 to 210_M may be arranged to overlap the display panel 220 on at least one surface of the display panel 220, as shown in FIG. 1. In some embodiments, the touch sensitive cells 210_1 to 210_M may be formed inside the display panel 220.

In the embodiments of the present disclosure, the touch sensing apparatus 100 is suitable for sensing the plurality of touch sensitive cells 210_1 to 210_M of the touch-and-display panel 210.

The touch sensitive cells 210_1~210_M may be touch electrodes. Each touch electrode forms a self-capacitor relative to a reference ground, which has a self-capacitance value. When a touch excitation signal is applied to the touch electrode, an electrical signal is output from the touch electrode. When a touch occurs and the touch excitation signal is applied to the touch electrode, additional capacitors will be introduced, thereby causing a change in the electrical signal output by the touch electrode, and the change in the electrical signal can be used to detect that the touch is occurring at the touch electrode.

The plurality of touch sensitive cells 210_1~210_M may be arranged according to the shape of the panel.

In some embodiments, 210_1~210_M may be arranged in an A*B (A row and B column) array form.

Although it is shown in FIG. 1 that the touch sensitive cell is of the type of self-capacitance, and most of the description in the context of the present disclosure is based on the type of self-capacitance, those skilled in the art will understand that the touch sensitive cell may also be of the type of mutual capacitance. In the case where the touch sensitive cell is of the type of mutual capacitance, the touch panel 210 includes touch electrodes (driving electrodes and sensing electrodes) arranged in rows and columns, and there is one mutual capacitor at an intersection of each row and each column, and the mutual capacitor may be considered as one touch sensitive cell. Each driving electrode is applied with a driving signal, and the sensing electrode signals for the driving signal are read from all the sensing electrodes. When a touch occurs, the mutual capacitance values of the touch electrodes near the touch position will change, which will cause the values of at least part of sensing electrode signals to change, so that it can be determined that the touch occurs.

The touch sensing apparatus 100 may include a plurality of touch sensing circuits, denoted by 110_1 to 110_N. One touch sensing circuit may be arranged for each touch sensitive cell, and it is determined that the touch is occurring in the touch sensitive cell based on the change of the electrical signal obtained from the touch sensitive cell, and the number of the touch sensing circuit should be M (that is, A*B). In some embodiments, one touch sensing circuit may be arranged for each row, and one touch sensing circuit may be configured for each column, that is, a plurality of sensing channels are configured horizontally and vertically, and each sensing channel is configured with one touch sensing circuit. In this case, it is necessary to detect the horizontal and vertical channels to determine the position of the touch sensitive cell where the touch occurs, based on the row and column corresponding to the channels where the electrical signal changes are detected, and the number of touch sensing circuits should be A+B. In addition, in the case that each touch sensitive cell is of the type of mutual capacitance, one or more circuits that apply the driving signal to each driving electrode and obtain a plurality of sensing electrode signals from the plurality of sensing electrodes may be collectively regarded as the touch sensing circuit corresponding to the driving electrode.

The touch sensing apparatus 100 may further include a plurality of operation units 112_1~112_N and a plurality of digital processing units 114_1~114_N (for example, each digital processing unit includes an analog-to-digital converter (ADC) and a digital back-end (DBE) circuit, the digital back-end circuit includes a digital processing circuit with related specific functions, and the DBE circuit may also be omitted, which is not limited in this disclosure), etc., which correspond to the plurality of touch sensing circuits 110_1~110_N in an one-to-one manner, where N is a positive integer. Each of the touch sensing circuits 110_1 to 110_N may obtain a sensing signal from a touch sensitive cell, and provide the obtained sensing signal to the subsequent operation unit and digital processing unit, etc., so as to output a digital signal. The paths between the touch sensing circuits 110_1 to 110_N to the operation units 112_1 to 112_N may provide signals to each other to perform respective signal operations. The subsequent controller may determine the touch position according to the respective signals provided by the digital processing units.

In this embodiment, the operation units 112_1 to 112_N may implement operation based on current, voltage, or electric charge, to implement the operation functions described in the embodiments of the present disclosure.

It should be noted that the "noise" mentioned above or below in the present disclosure may include interference from the display panel received by the touch panel, such as cathode noise and common mode noise from the display panel 220 or other noise, which is not limited in this disclosure. In one embodiment, the display panel may be, for example, an Organic Light-Emitting Diode (OLED) display panel, a Liquid-Crystal Display (LCD) panel, a mini-led or other types of display panels, which is not limited in this disclosure. In addition, the touch sensing circuit may also be integrated in an integrated chip with a display driver, such as a Touch and Display Driver Integration (TDDI) chip. In addition, in another embodiment, the touch-and-display panel may also be integrated with a fingerprint touch panel, so that the "noise" in the present disclosure is more likely to include interference from the fingerprint touch panel. In addition, the touch sensing circuit is also integrated in an integrated chip having a fingerprint sensing driver and a display driver, such as a Fingerprint, Touch and Display driver Integration (FTDI) chip.

In the embodiments of the present disclosure, taking self-capacitance as an example, for each touch sensitive cell, in a case that an area of a contact pad of the touch electrode corresponding to the touch sensitive cell is the same, based on a formation principle of parallel plate capacitor, it may be known that when a horizontal position of the touch electrode is fixed, the self-capacitance of the touch electrode is proportional to the area of the contact pad, so it is default that the capacitances of the two touch electrodes are the same. As for the noise signals indicating external interferences (for example, display noise, common mode noise, etc.) they are subject to, the influences of the noise signals on the touch sensitive cells may be as shown in FIG. 2, and the value of each noise signal is correlated with the area of the contact pad of the touch electrode of the corresponding touch sensitive cell and correlated with the position of the touch sensitive cell.

Figure 2:
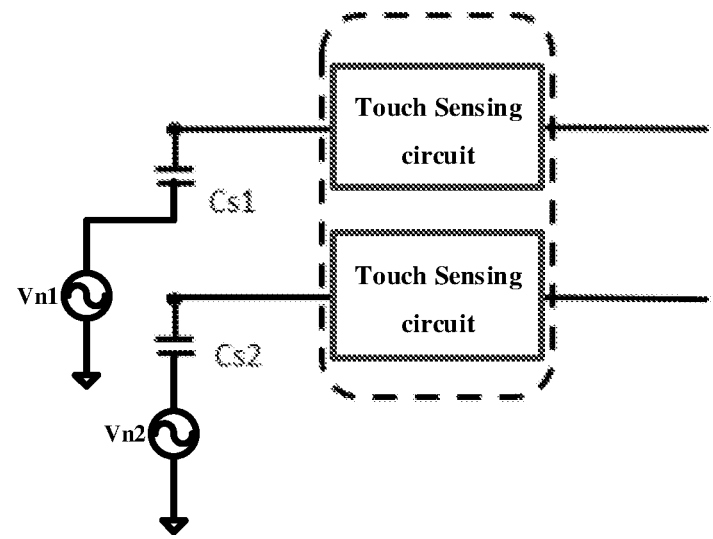
FIG. 2 shows a schematic diagram of influence of noise signals on touch sensitive cells according to the embodiments of the present disclosure.

In FIG. 2, two touch sensitive cells and corresponding two touch sensing circuits are shown. The first touch sensitive cell has a self-capacitance Cs1 and the second touch sensitive cell has a self-capacitance Cs2. In a case shown in FIG. 2, the area of the contact pad of the touch electrode corresponding to the touch sensitive cell is the same. Since a size of the self-capacitance may be determined by the area of the contact pad of the touch electrode corresponding to the touch sensitive cell, the self-capacitance Cs1 and Cs2 of each touch sensitive cell are equal, and voltage values Vn1 and Vn2 of the noise signals are respectively applied to the self-capacitances Cs1 and Cs2 of each touch sensitive cell. In addition, generally for a same touch panel, the value of the voltage Vn1 or Vn2 of the noise signal which each touch electrode is subjected to is also correlated with the area of the contact pad of the touch electrode and the position of the touch sensitive cell.

Similarly, when the touch sensitive cell is of the type of mutual capacitance, the mutual capacitance value will also be determined by the relative area of the touch electrode (the driving electrode and the sensing electrode). For example, the mutual capacitance value of the mutual capacitor between the driving electrode in the first row and the sensing electrode in the first column is determined by the relative area of the two electrodes. In addition, the value of the voltage of the noise signal which the mutual capacitor is subjected to is also correlated with the relative area and the position of the touch electrode (the driving electrode and the sensing electrode).

The touch sensing method for the touch panel proposed by the embodiments of the present disclosure may be used to reduce the influence of these noises on the touch sensing result.

In addition, in other cases, the self-capacitances (mutual capacitances) of some touch sensitive cells may not be equal. For example, Cs1 and Cs2 in FIG. 2 may be unequal, which may be determined according to the size of the area of each touch electrode, and need to be taken into consideration when performing touch sensing, which will be described in detail in the following description.

Figure 3A:
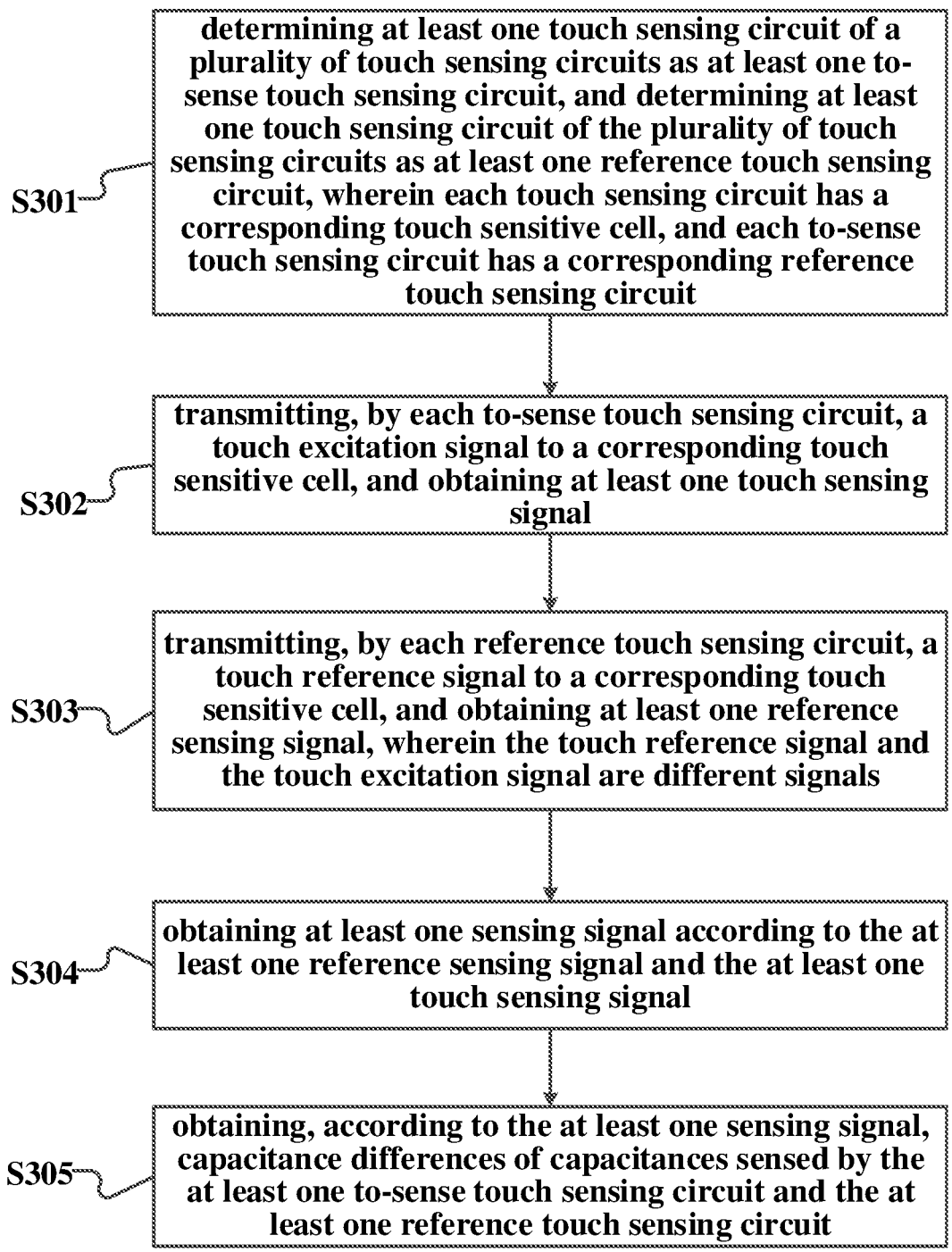
FIGS. 3A-3B show schematic flowcharts of a touch sensing method for a touch panel according to the embodiments of the present disclosure.
Figure 3B:
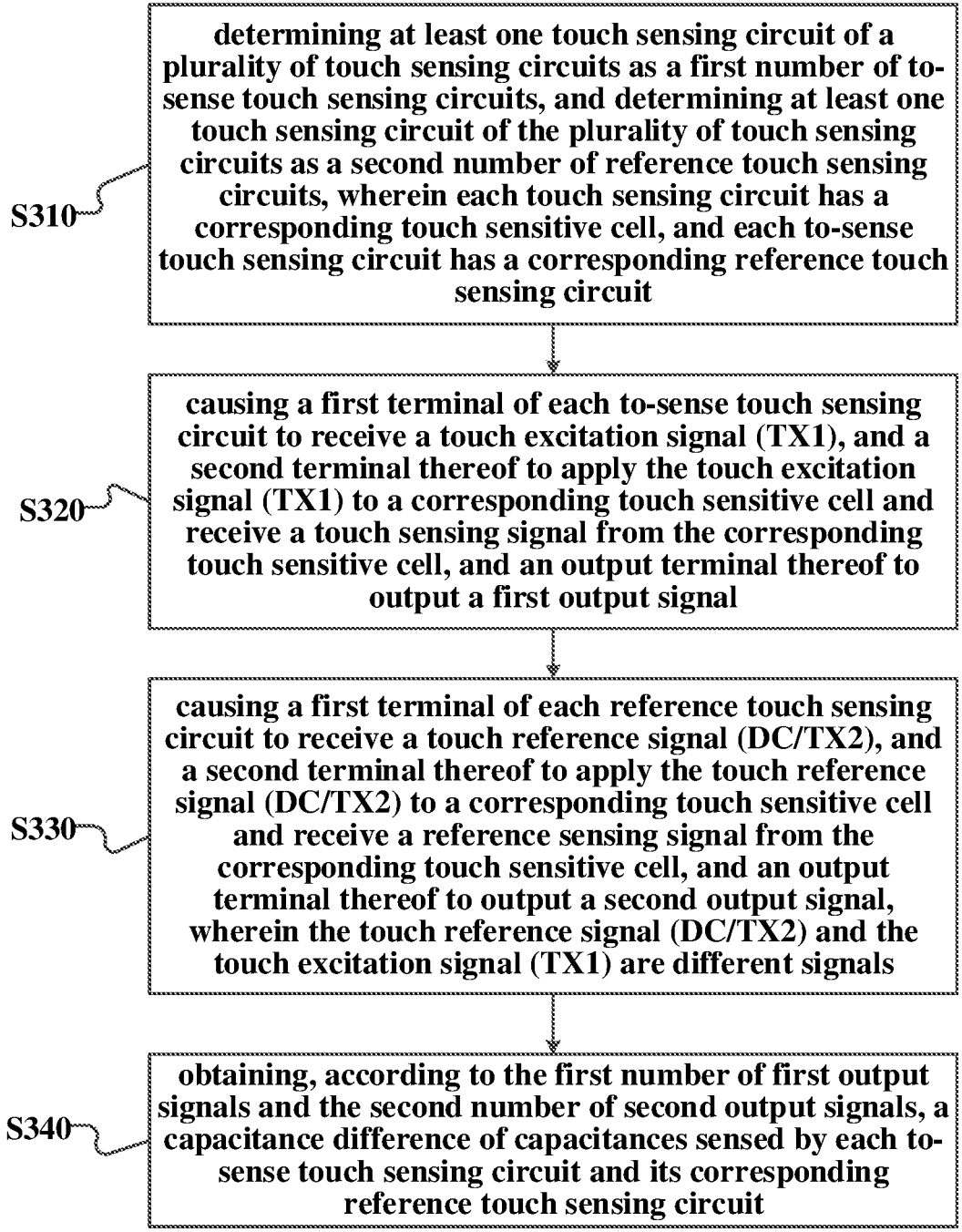

Hereinafter, the touch sensing method for the touch panel according to the embodiments of the present disclosure will be described in detail with reference to FIGS. 3A-4E. FIGS. 3A-3B show schematic flowcharts of the touch sensing method for the touch panel according to the embodiments of the present disclosure. This touch sensing method may be used in the touch sensing apparatus shown in FIG. 1. FIGS. 4A-4E show schematic diagrams of an example correspondence relationship between touch sensing circuits used for touch sensitive cells to be sensed (also referred to "to-sense touch sensing circuits" for brevity) and touch sensing circuits used for reference touch sensitive cells (also referred to "reference touch sensing circuits" for brevity) according to the embodiments of the present disclosure.

The touch panel includes a plurality of touch sensitive cells.

As shown in FIG. 3A, in step S301, at least one touch sensing circuit of the plurality of touch sensing circuits is determined as at least one to-sense touch sensing circuit, and at least one touch sensing circuit of the plurality of touch sensing circuits is determined as at least one reference touch sensing circuit.

Each to-sense touch sensing circuit has a corresponding reference touch sensing circuit. For example, the at least one to-sense touch sensing circuit may correspond to the same one reference touch sensing circuit, or the at least one to-sense touch sensing circuit may correspond to different reference touch sensing circuits.

Each touch sensing circuit has a corresponding reference touch sensing cell. For example, in the case where the touch sensitive cell is of the type of self-capacitance, the touch sensing circuit may correspond to the touch sensitive cell in a one-to-one manner. Alternatively, each to-sense touch sensing circuit corresponds to the plurality of touch sensitive cells in one row or one column, and its corresponding reference touch sensing circuit also corresponds to the plurality of touch sensitive cells in one row or one column. In addition, when the to-sense touch sensing circuit and the reference touch sensing circuit may work in a time-division manner, the to-sense touch sensing circuit and the reference touch sensing circuit may even be the same one touch sensing circuit, so that the same one touch sensitive cell may be sensed at different times (in a time-division manner).

In the case where the touch sensitive cell is of the type of mutual capacitance, a touch excitation signal may be applied to each driving electrode, and a plurality of sensing electrode signals may be obtained from a plurality of sensing electrodes. In this case, each touch sensing circuit may be divided into two parts: an excitation signal application sub-circuit and a touch detection sub-circuit. Moreover, the respective driving electrodes of all touch sensitive cells on one row may be shared, and the respective excitation signal application sub-circuits may also be shared. A plurality of sensing electrode signals may be obtained from different sensing electrodes through different touch detection sub-circuits. Similarly, when the to-sense touch sensing circuit and the reference touch sensing circuit may work in a time-division manner, the to-sense touch sensing circuit and the reference touch sensing circuit can share a plurality of touch detection sub-circuits (for example, the number of the plurality of touch detection sub-circuits is the same as the number of sensing electrodes), and the to-sense touch sensing circuit and the reference touch sensing circuit may even be the same one touch sensing circuit, so that the touch excitation signal and the touch reference signal may be applied to the same one driving electrode at different times (in a time-division manner) and accordingly a plurality of sensing electrode signals may be obtained at different times (in a time-division manner) from all the sensing electrodes.

In step S302, a touch excitation signal is transmitted by each to-sense touch sensing circuit to a corresponding touch sensitive cell, and at least one touch sensing signal is obtained.

For example, in the case that the touch sensitive cell is of the type of self-capacitance, each to-sense touch sensing circuit may apply the touch excitation signal to one corresponding touch sensitive cell, and obtain one sensing signal from the touch sensitive cell as the touch sensing signal. A plurality of to-sense touch sensing circuits can obtain a plurality of sensing signals from a plurality of touch sensitive cells, that is, a plurality of touch sensing signals.

For example, in the case that the touch sensitive cell is of the type of mutual capacitance, an excitation signal application sub-circuit shared by a plurality of to-sense touch sensing circuits corresponding to one driving electrode on one row applies a driving signal to the driving electrode, and the touch detection sub-circuits of the plurality of to-sense touch sensing circuits obtain a plurality of sensing electrode signals from the plurality of sensing electrodes as the plurality of touch sensing signals. For example, when a driving signal is applied to one driving electrode on one row, the plurality of touch sensing signals for the driving signal will be obtained from all the sensing electrodes.

In step S303, a touch reference signal is transmitted by each reference touch sensing circuit to a corresponding touch sensitive cell, and at least one reference sensing signal is obtained, and the touch reference signal and the touch excitation signal are different signals.

The process of obtaining the at least one reference sensing signal is similar to the process of obtaining the at least one touch sensing signal described above.

In addition, the touch excitation signal may be a variable signal (for example, a signal with variable frequency or amplitude), and the touch reference signal may be a direct current signal or another variable signal.

In step S304, at least one sensing signal is obtained according to the at least one reference sensing signal and the at least one touch sensing signal.

For example, for each touch sensing signal, subtraction is performed between the touch sensing signal and one reference sensing signal to obtain a differential signal as one sensing signal. The to-sense touch sensing circuit that obtains the touch sensing signal corresponds to the reference touch sensing circuit that obtains the one reference sensing signal.

For example, in the case that the touch sensitive cell is of the type of self-capacitance, subtraction is performed between the touch sensing signal obtained from the touch sensitive cell corresponding to each to-sense touch sensing circuit and the reference sensing signal obtained from the touch sensitive cell corresponding to the reference touch sensing circuit corresponding to the to-sense touch sensing circuit, to obtain a differential signal.

For example, in the case where the touch sensitive cell is of the type of mutual capacitance, a plurality of touch sensing signals are acquired after a to-sense touch sensing circuit (its excitation signal application sub-circuit) applies a touch excitation signal to one driving electrode. Subtraction is performed on each of the plurality of touch sensing signals and one of a plurality of reference sensing signals, to obtain at least one differential signal, in which the plurality of reference sensing signals are obtained after a reference touch sensing circuit (its excitation signal application sub-circuit) corresponding to the to-sense touch sensing circuit applies a touch reference signal to another driving electrode. For a corresponding pair of to-sense touch sensing circuit and the reference touch sensing circuit, the plurality of touch sensing signals and the plurality of reference sensing signals may be combined arbitrarily. For example, for the touch sensitive cells of the type of mutual capacitance arranged in a 3×3 array, after the excitation signal application sub-circuit shared by first to third to-sense touch sensing circuits applies a touch excitation signal TX1 to the driving electrode on the first row, the first to third to-sense touch sensing circuits may obtain three touch sensing signals (R11, R12, R13); after the excitation signal application sub-circuit shared by the corresponding first to third reference touch sensing circuits applies a touch reference signal TX2 to the driving electrode on the second row, the first to third reference touch sensing circuits may obtain three reference sensing signals (R21, R22, R23), and subtraction may be performed on one of the touch sensing signals (e.g., R11) and any reference sensing signal (e.g., R21, R22 or R23).

In addition, it is also considered that the capacitance value at each touch sensitive cell and the value of the noise signal and so on will be determined by the area of the contact pad of (in case of self-capacitance) or relative area (relative area of driving electrode and sensing electrode in case of mutual capacitance) of the touch electrode of each touch sensitive cell. Therefore, for a pair of touch sensing signal and reference sensing signal as mentioned above, the reference touch signal may be multiplied by a preset coefficient, where the preset coefficient is related with a ratio of the area of the contact pad of (in case of self-capacitance) or relative area (relative area of driving electrode and sensing electrode in case of mutual capacitance) of the touch electrode of one touch sensitive cell from which the touch sensing signal is obtained relative to the area of the contact pad of (in case of self-capacitance) or relative area (relative area of driving electrode and sensing electrode in case of mutual capacitance) of the touch electrode of one touch sensitive cell from which one reference touch signal is obtained. Then subtraction is performed on the touch sensing signal and the reference sensing signal after being multiplied by the preset coefficient, to obtain the differential signal.

Optionally, the touch excitation signal applied to one touch sensitive cell from which the touch sensing signal is obtained and the touch reference signal applied to one touch sensitive cell from which the one reference sensing signal is obtained are two variable signals with difference in at least one of phase, amplitude and frequency, etc. In case that only the amplitudes of two variable signals are different, the ratio of the amplitudes of the two variable signals is related to the ratio between the values of noise signals which the two touch sensitive cells are subjected to, and/or the above-mentioned ratio between the areas of contact pads or relative areas of the touch electrodes.

In step S305, the capacitance differences of capacitances sensed by the at least one to-sense touch sensing circuit and the at least one reference touch sensing circuit are obtained according to the at least one sensing signal.

Each of the at least one sensing signal is obtained after at least part of noises have been removed, so the at least one sensing signal may be used to calculate the capacitance differences to determine whether a touch has occurred.

In the following, more details of the embodiments of the present disclosure are described in detail by taking self-capacitance as an example.

FIG. 3B shows a touch sensing method in the case that the touch sensitive cell is of the type of self-capacitance.

As shown in FIG. 3B, in step S310, at least one touch sensing circuit of a plurality of touch sensing circuits is determined as a first number of to-sense touch sensing circuits, and at least one touch sensing circuit of the plurality of touch sensing circuits is determined as a second number of reference touch sensing circuits, where each touch sensing circuit has a corresponding touch sensitive cell, and each to-sense touch sensing circuit has a corresponding reference touch sensing circuit.

Optionally, each touch sensing circuit has a corresponding touch sensitive cell, for sensing a touch occurring on the touch sensitive cell and outputting a touch signal. For example, when a user's finger or pen touches or approaches the touch sensitive cell, the touch sensing circuit may sense a change in capacitance at the touch sensitive cell, thereby outputting an output signal indicating the change to subsequent operation unit.

Optionally, the plurality of touch sensing circuits may be selectively configured into different types of touch sensing circuits according to different configuration modes. For example, the correspondence relationship of the to-sense touch sensing circuits and the reference touch sensing circuits may be all-to-one, many-to-one, and one-to-one. Generally, the number of the to-sense touch sensing circuits is greater than or equal to the reference touch sensing circuit.

For example, in the case of all-to-one, the first number of to-sense touch sensing circuits may correspond to the same one reference touch sensing circuit, that is, only one touch sensing circuit of the plurality of touch sensing circuits serves as the reference touch sensing circuit, that is to say, the second number is 1, and the first number is N−1.

For another example, in the case of one-to-one or many-to-one, the first number of to-sense touch sensing circuits may correspond to different reference touch sensing circuits, that is, the second number may be greater than 1, and multiple to-sense touch sensing circuits may correspond to one reference touch sensing circuit. In a special case, the to-sense touch sensing circuits and the reference touch sensing circuits are in one-to-one correspondence (one-to-one). In another special case, the plurality of touch sensing circuits are divided into a plurality of groups, and each group includes one reference touch sensing circuit and the remaining to-sense touch sensing circuits (many-to-one).

It should be understood that, according to the specific configuration, one touch sensing circuit may not only be used as the to-sense touch sensing circuit corresponding to one reference touch sensing circuit, but may also be used as the reference touch sensing circuit corresponding to another to-sense touch sensing circuit. That is, the to-sense touch sensing circuit and the reference touch sensing circuit may correspond in many manners, as long as each to-sense touch sensing circuit can correspond to one reference touch sensing circuit, and the touch sensing for all touch sensitive cells may be implemented through timing control of each touch sensing circuit, and so on.

Figure 4A:
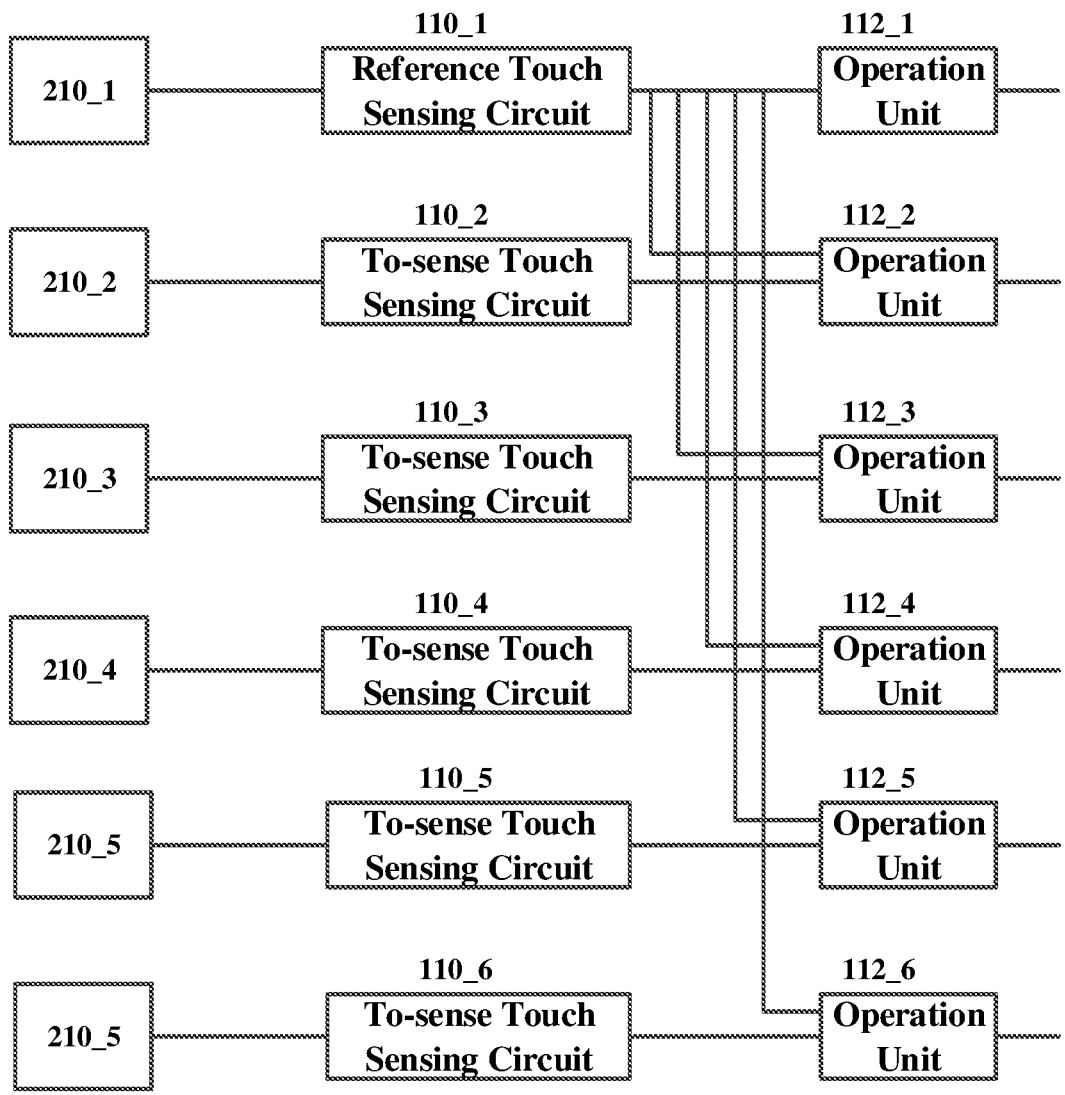
FIGS. 4A-4E show schematic diagrams of an example correspondence relationship between to-sense touch sensing circuits and reference touch sensing circuits according to the embodiments of the present disclosure.

For example, assuming that there are 6*1 touch sensitive cells (actually, the touch sensitive cells are not limited to 6, and this is just for illustration), as shown in FIG. 4A, which corresponds to the all-to-one case, the touch sensing circuit for sensing the first touch sensitive cell is determined to be the reference touch sensing circuit (the second number is 1), and the touch sensing circuits for sensing the remaining 5 touch sensitive cells are determined to be the to-sense touch sensing circuits (the first number is 5), the 5 touch sensing circuits respectively receive touch sensing signals from their corresponding touch sensitive cells, and the reference touch sensing circuit receives the reference sensing signal from the corresponding one touch sensitive cell.

Figure 4B:
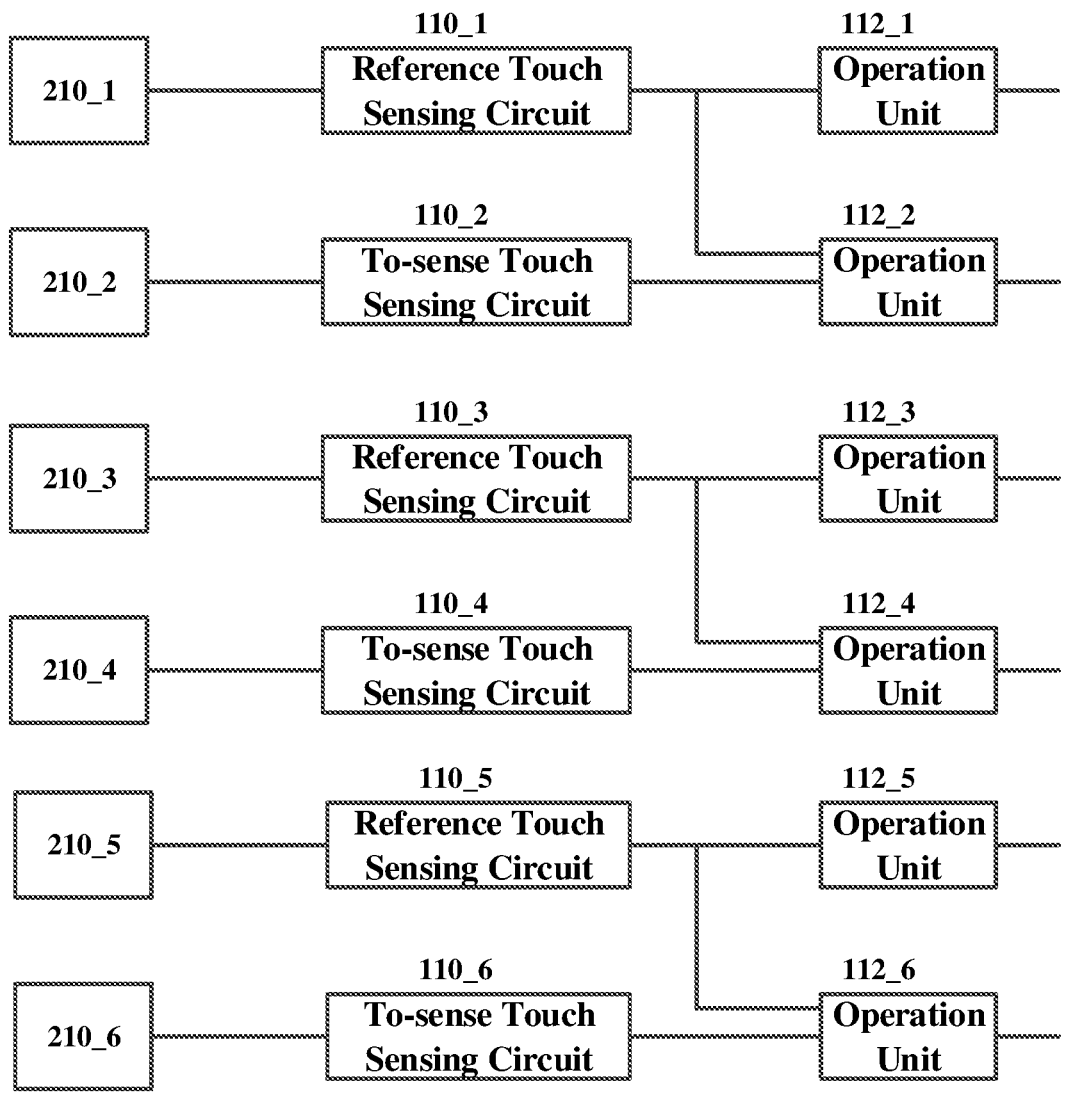
Figure 4C:
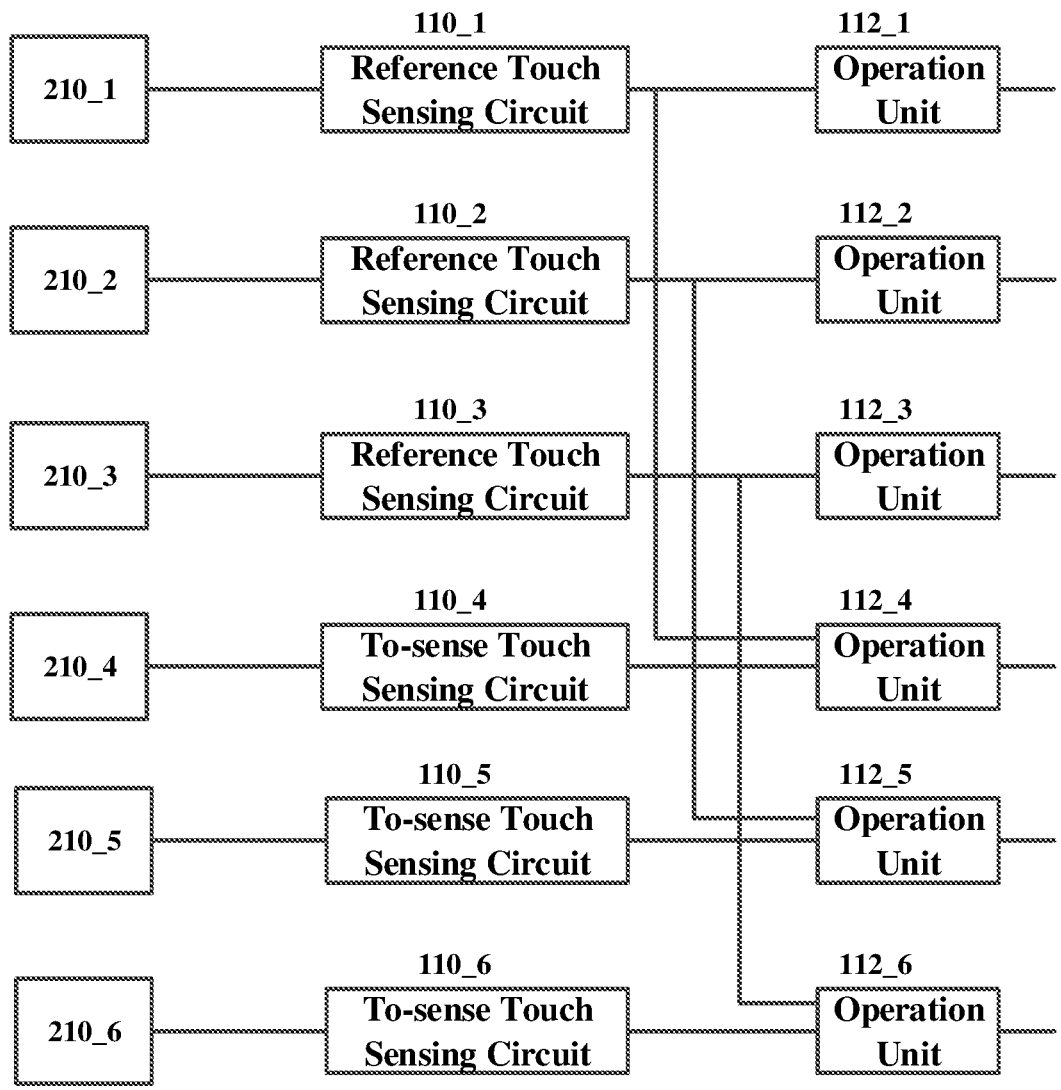

In addition, for the one-to-one case, as shown in FIG. 4B, the touch sensing circuits corresponding to every two adjacent touch sensitive cells may also be respectively used as the reference touch sensing circuit and the to-sense touch sensing circuit. Alternately, as shown in FIG. 4C, the first to the third touch sensing circuits may be grouped into a reference touch sensing circuit group, the fourth to the sixth touch sensing circuits may be grouped into a to-sense touch sensing circuit group, and then, the touch sensing circuits at the corresponding position in each group (e.g., the first and the fourth, the second and the fifth, and the third and the sixth touch sensing circuits) respectively correspond.

In addition, for the special case of one-to-one, when the to-sense touch sensing circuit and the reference touch sensing circuit may work in a time-division manner, the to-sense touch sensing circuit and the reference touch sensing circuit may even be the same one touch sensing circuit, so that the touch sensing for the same one touch sensitive cell may be performed at different times (in a time-division manner), that is, the touch sensing circuit itself serves as the to-sense touch sensing circuit and the reference touch sensing circuit in different time periods. For example, in a first time period, respective touch sensing circuits are used as the to-sense touch sensing circuits, and apply touch excitation signals to the first to sixth touch sensitive cells, respectively, and obtains 6 touch sensing signals. In a second time period, respective touch sensing circuits are used as the reference touch sensing circuits, and apply reference touch sensing signals to the first to sixth touch sensitive cells, respectively, and obtains 6 reference sensing signals.

Figure 4D:
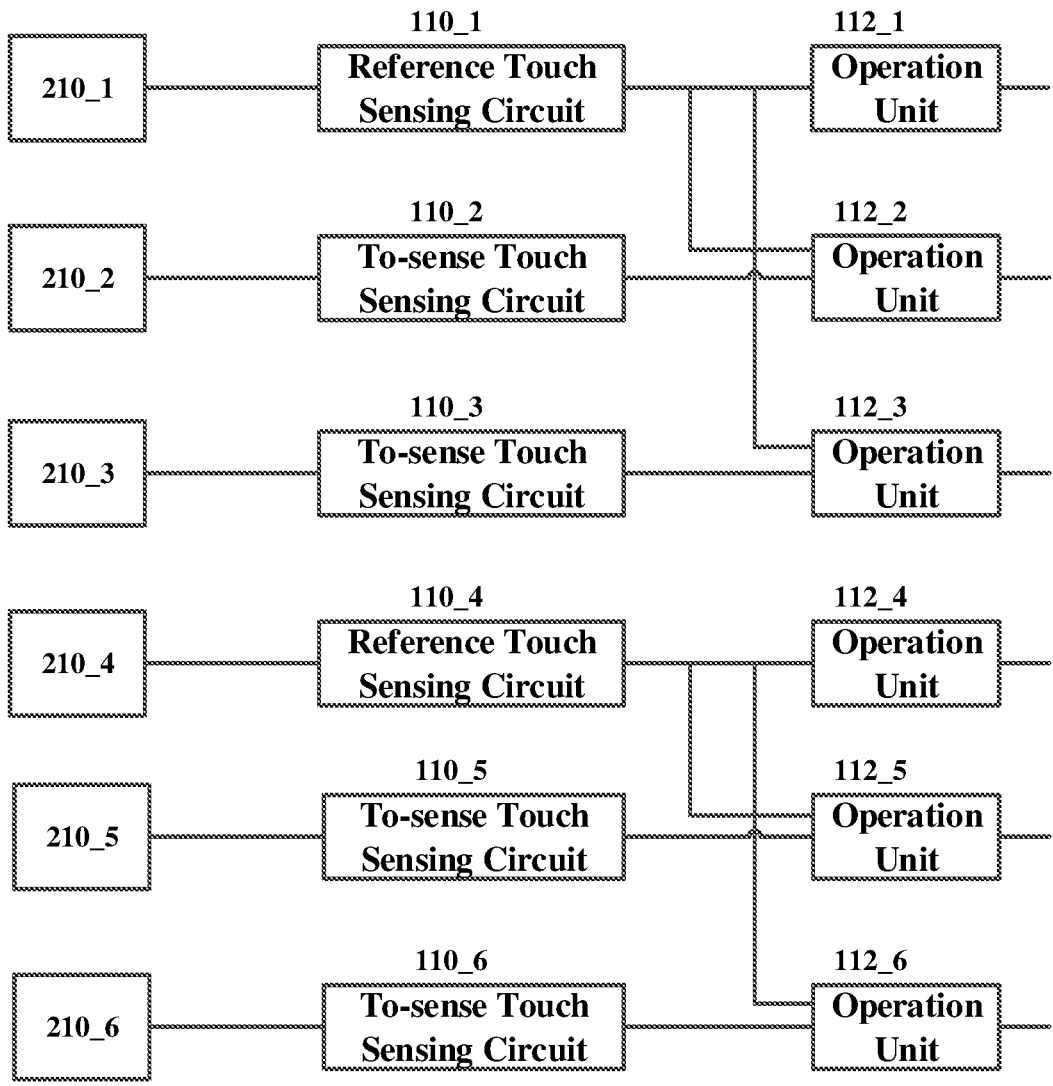

For another example, for the many-to-one case, as shown in FIG. 4D, the first to the third touch sensing circuits may be grouped into the first group, and the fourth to the sixth touch sensing circuits may be grouped into the second group. The first touch sensing circuit in the first group is used as the reference touch sensing circuit, the remaining two touch sensing circuits are used as the to-sense touch sensing circuits, the fourth touch sensing circuit included in the second group is used as the reference touch sensing circuit, and the remaining two touch sensing circuits are used as the to-sense touch sensing circuits.

Figure 4E:
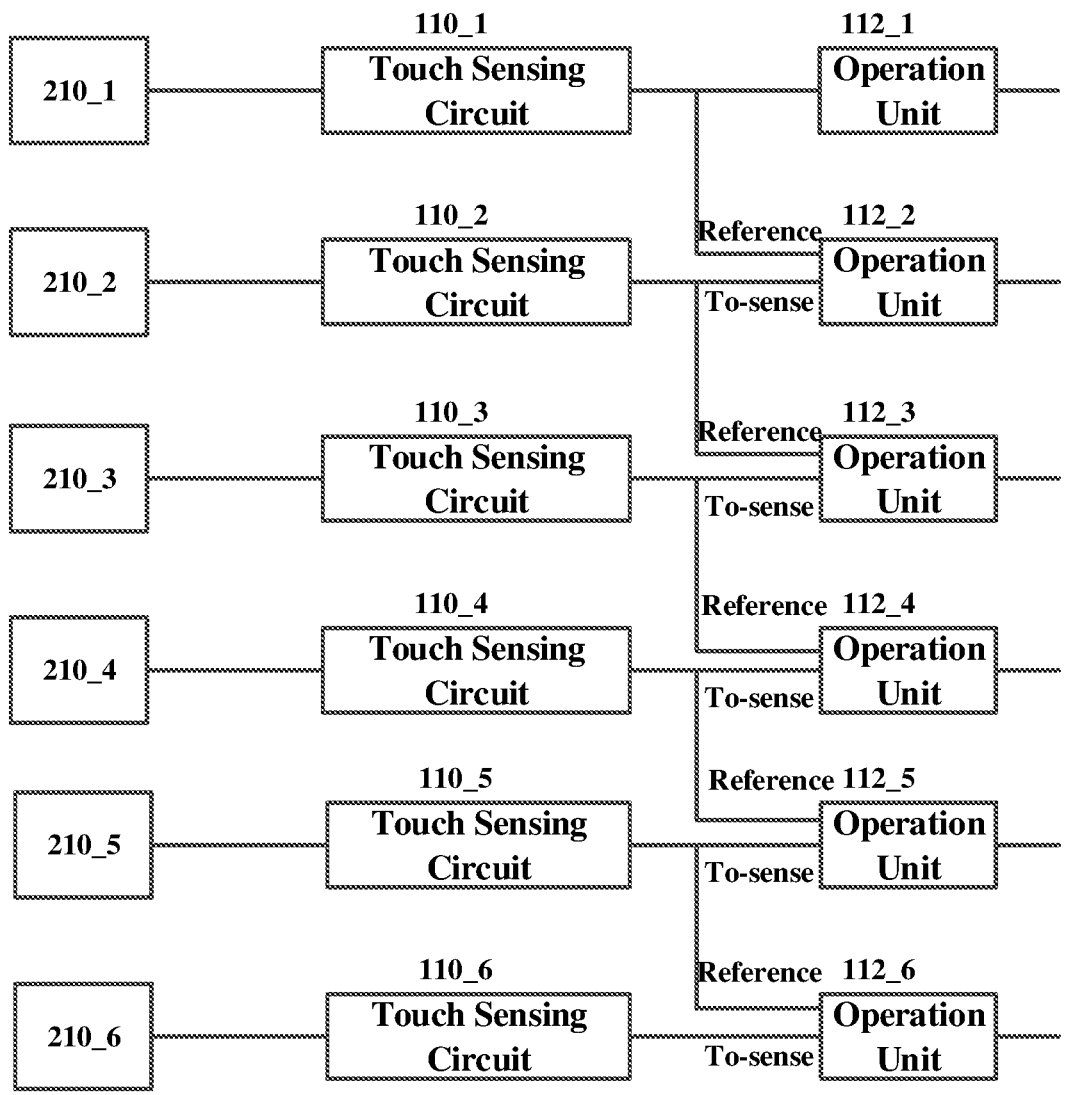

In addition, as mentioned above, one touch sensing circuit may not only be used as the to-sense touch sensing circuit corresponding to one reference touch sensing circuit, but may also be used as the reference touch sensing circuit corresponding to another to-sense touch sensing circuit. As shown in FIG. 4E, the second touch sensing circuit may be the to-sense touch sensing circuit relative to the first touch sensing circuit, but may be the reference touch sensing circuit relative to the third touch sensing circuit. Similarly, the third touch sensing circuit is the to-sense touch sensing circuit relative to the second touch sensing circuit, but it may be the reference touch sensing circuit relative to the fourth touch sensing circuit, and so on, and the sixth touch sensing circuit may correspond to the first touch sensing circuit. Thus, touch detection may be performed on all touch sensitive cells.

Output signals of each pair of the to-sense touch sensing circuit and the reference sensing circuit are input to an operation unit for calculation, and the output signal of each reference touch sensing circuit is also individually input to an operation unit, which will be used in a residual noise signal elimination process as will be described later. Of course, there may also be other correspondence relationship of the to-sense touch sensing circuits and the reference touch sensing circuits according to the inventive concept of the present disclosure, which do not depart from the scope of the present disclosure.

As will be described later, when the touch reference signal received by the reference touch sensing circuit is a DC voltage, since the reference touch sensing circuit cannot sense the touch at its corresponding touch sensitive cell at this time, in order to perform the complete touch sensing process, the above determination process may be performed multiple times, so that the touch sensing circuit corresponding to each touch sensitive cell may be used as the to-sense touch sensing circuit for one time, so as to sense the touch that occurs at the touch sensitive cell. For example, if the touch sensitive cells (self-capacitance) on the touch panel are arranged in a 3×3 array (the number of the touch sensitive cells is 9), in the first determination process, the touch sensing circuit corresponding to the touch sensitive cell in the first row and the first column (1,1) may be used as the reference touch sensing circuit, and the eight touch sensing circuits corresponding to the remaining eight touch sensitive cells are used as the to-sense touch sensing circuits, and then the touch sensing operation as described later is performed to judge whether touch occurs at these 8 touch sensitive cells; then, in the second determination process, the touch sensing circuit corresponding to the touch sensitive cell in the first row and the first column (1,1) is used as the to-sense touch sensing circuit, and any one of the eight touch sensing circuits corresponding to the remaining touch sensitive cells is used as the reference touch sensing circuit, and then the touch sensing operation as described later is performed to judge whether the touch occurs at the touch sensitive cell in the first row and the first column (1,1).

Therefore, in the case shown in FIG. 4A, in the second determination process (not shown), the touch sensing circuit corresponding to the first touch sensitive cell may be determined as the to-sense touch sensing circuit, and any one of the second to the sixth touch sensing circuits is determined as the corresponding reference touch sensing circuit.

In the case shown in FIG. 4B, in the second determination process (not shown), the touch sensing circuits corresponding to every two adjacent touch sensitive cells may also be used as the to-sense touch sensing circuit and the reference touch sensing circuit, respectively.

In the case shown in FIG. 4C, in the second determination process (not shown), the first to the third touch sensing circuits may be grouped into the touch sensing circuit group to be sensed, and the fourth to the sixth touch sensing circuits may be grouped into reference touch sensing circuit groups, and then the touch sensing circuits at the same position in each group respectively correspond.

In the case shown in FIG. 4D, in the second determination process (not shown), the first touch sensing circuit in the first group and the fourth touch sensing circuit in the second group may be determined as the to-sense touch sensing circuits, the second or third touch sensing circuit in the first group is used as the reference touch sensing circuit corresponding to the first touch sensing circuit, and the fifth or sixth touch sensing circuit in the second group is used as the reference touch sensing circuit corresponding to the second touch sensing circuit.

In step S320, a first terminal of each to-sense touch sensing circuit receives a touch excitation signal (TX1), and a second terminal thereof applies the touch excitation signal (TX1) to a corresponding touch sensitive cell and receives the touch sensing signal from a corresponding touch sensitive cell, and a first output signal is output from an output terminal thereof.

For example, the touch excitation signal may be a first variable signal, such as a pulse wave, a sine wave, a triangle wave signal, and other variable signals (signals with variable amplitude, and/or frequency, etc.).

When the to-sense touch sensing circuit applies the touch excitation signal (TX1) to the touch sensitive cell, the to-sense touch sensing circuit may obtain an electrical signal (for example, voltage, current or electric charge signal) from the touch sensitive cell. For example, by charging and discharging the self-capacitor of the touch electrode (touch sensitive cell) by the touch excitation signal, a voltage signal having a corresponding charging and discharging voltage may be obtained from the touch electrode.

As mentioned above, the display panel and fingerprint recognizing panel and so on will bring noise to the touch sensing of the touch panel. When the touch excitation signal is the first variable signal, in the case where a touch occurs, the touch sensing signal obtained by the to-sense touch sensing circuit includes a noise signal and a touch signal, so the first output signal may be regarded as including a first noise signal and a first touch signal.

After obtaining the touch sensing signal from the touch sensitive cell, the to-sense touch sensing circuit outputs the first output signal associated with the touch sensing signal from the output terminal. Since there are the first number of to-sense touch sensitive circuits, there are the first number of first output signals correspondingly.

In step S330, the first terminal of each reference touch sensing circuit receives a touch reference signal (DC/TX2), and the second terminal thereof applies the touch reference signal (DC/TX2) to a corresponding touch sensitive cell and receives a reference sensing signal from the corresponding touch sensitive cell, and a second output signal is output from the output terminal thereof, where the touch reference signal (DC/TX2) and the touch excitation signal (TX1) are different signals, that is, are different in at least one of frequency, phase, and amplitude.

After obtaining the reference sensing signal from the touch sensitive cell, the reference touch sensing circuit outputs the second output signal associated with the reference sensing signal from the output terminal. Since there are the second number of reference touch sensitive cells, there are the second number of second output signals correspondingly.

The working process of the reference touch sensing circuit and the to-sense touch sensing circuit are the same, except that the positions of the touch sensitive cells respectively corresponding to the reference touch sensing circuit and the to-sense touch sensing circuit are different (in case of time-division, the positions may also be the same), and the touch reference signal (DC/TX2) and the touch excitation signal (TX1) involved are different signals.

The touch reference signal may be a DC signal or a second variable signal different from the first variable signal. When the touch reference signal is a DC signal (for example, a voltage signal of 0V, 1V), after the touch reference signal is applied to the reference touch sensitive cell, even if a touch occurs, the reference sensing signal obtained by the reference touch sensing circuit only includes the noise signal; when the touch reference signal is the second variable signal, in the case of a touch occurs, the reference sensing signal obtained by the reference touch sensing circuit includes the noise signal and the touch signal, so the second output signal is regarded as including the second noise signal and the second touch signal. The second output signal is used for elimination of the noise signal in the first output signal output by the to-sense touch sensing circuit corresponding to the reference touch sensing circuit. Optionally, in the case where the touch excitation signal is the first variable signal and the touch reference signal is the second variable signal, the touch excitation signal and the touch reference signal may be signals with the only difference in amplitude.

Optionally, each to-sense touch sensing circuit and each reference touch sensing circuit both correspond to only one touch sensitive cell, or each to-sense touch sensing circuit and each reference touch sensing circuit both correspond to multiple touch sensitive cells of the same number.

For example, each to-sense touch sensing circuit may correspond to only one touch sensitive cell (that is, the touch excitation signal is applied to the one touch sensitive cell and the touch sensing signal is obtained from it), and the reference touch sensing circuit corresponding to the to-sense touch sensing circuit may correspond to another touch sensitive cell.

For example, each to-sense touch sensing circuit may correspond to the touch sensitive cells on the same row or column, and correspondingly, the reference touch sensing circuit corresponding to the to-sense touch sensing circuit may correspond to the touch sensitive cells on another row or column.

In step S340, a capacitance difference of capacitances sensed by each to-sense touch sensing circuit and a corresponding reference touch sensing circuit is obtained according to the first number of first output signals and the second number of second output signals.

Subtraction is performed on the first output signal (associated with the touch sensing signal) output by each to-sense touch sensing circuit and the second output signal (associated with the reference sensing signal) output by the corresponding reference touch sensing circuit. When a touch occurs, the first output signal includes the first noise signal and the first touch signal, and the second output signal includes the second noise signal (when the touch reference signal is DC) or the second noise signal and the second touch signal (when the touch reference signal is the second variable signal), by performing the subtraction on the first output signal and the second output signal, at least a part of the noise signal may be eliminated, thereby improving the accuracy of sensing. Besides, when the touch sensitive cells respectively corresponding to the to-sense touch sensing circuit and the reference touch sensing circuit are closer to each other, the interferences subjected by the touch sensitive cells are more similar to each other (if the areas of the contact pads of the touch electrodes of the touch sensitive cells are the same), so the first noise signal is more similar to the second noise signal, so that the noise elimination effect can be better, and the noise may even be eliminated completely.

Therefore, subtraction may be performed on the first output signal output by each to-sense touch sensing circuit and the second output signal output by the corresponding reference touch sensing circuit to obtain the differential signal.

As described above, the first output signal is associated with the touch sensing signal and includes the first noise signal and the first touch signal, and the second output signal is associated with the reference sensing signal and includes the second noise signal and the second touch signal (taking the first noise signal being the same as the second noise signal as an example), and the touch signal may be embodied as a current, voltage or electric charge signal. In the case that a touch occurs, if the touch reference signal is the DC signal, the second output signal only includes the noise signal, and the differential signal obtained by performing subtraction on the first output signal and the second output signal does not include noise signal any more, and only includes the first touch signal, and the value of voltage, current or electric charge corresponding to the first touch signal will change relative to a theoretical value (the theoretical value may be predetermined based on the structure of the to-sense touch sensing circuit and the touch excitation signal TX1); if the touch reference signal is the second variable signal TX2, the differential signal obtained by performing subtraction on the first output signal and the second output signal only includes a signal indicating a difference in the first touch signal and the second touch signal (the noise signal has been eliminated), and the value of current, voltage or electric charge corresponding to the differential signal may also change relative to the theoretical value (similarly, it may be predetermined based on the structure of the to-sense touch sensing circuit/reference touch sensing circuit, the touch excitation signal TX1 and the touch reference signal TX2).

Therefore, based on the first output signal and the second output signal output by each pair of touch sensing circuits (each to-sense touch sensing circuit and one corresponding reference touch sensing circuit), a plurality of differential signals may be obtained. According to the respective values of these differential signals, a plurality of capacitance differences of capacitances sensed by a plurality of pairs of touch sensing circuits may be obtained.

As mentioned above, in some cases, for each pair of the to-sense touch sensing circuit and the reference touch sensing circuit, the areas of contact pads of the touch electrodes of their respective touch sensitive cells may not be equal, so it is necessary to multiply the second output signal output by the reference touch sensing circuit by the preset coefficient, and then perform subtraction on the first output signal and the second output signal multiplied by the preset coefficient, to obtain the differential signal, where the preset coefficient is related to the ratio between the areas of the contact pads of the touch electrodes of the touch sensitive cells respectively corresponding to the to-sense touch sensing circuit and the corresponding reference touch sensing circuit.

In addition, at the same time, when the touch excitation signal received by the to-sense touch sensing circuit in the pair and the touch reference signal received by the corresponding reference touch sensing circuit in the pair are two variable signals with the only difference in amplitude, a ratio of the amplitudes of the two variable signals is related to the ratio between the areas of the contact pads of the touch electrodes of the touch sensitive cells respectively corresponding to the to-sense touch sensing circuit and the corresponding reference touch sensing circuit. This will be described in detail later in conjunction with FIGS. 5A-5B.

More specifically, the first output signal and the second output signal are voltage signals. At this time, the first output signal output by each to-sense touch sensing circuit and the second output signal output by the corresponding reference touch sensing circuit may be input to a subtractor circuit for subtraction. The subtractor circuit may be, for example, an analog circuit.

Figure 6A:
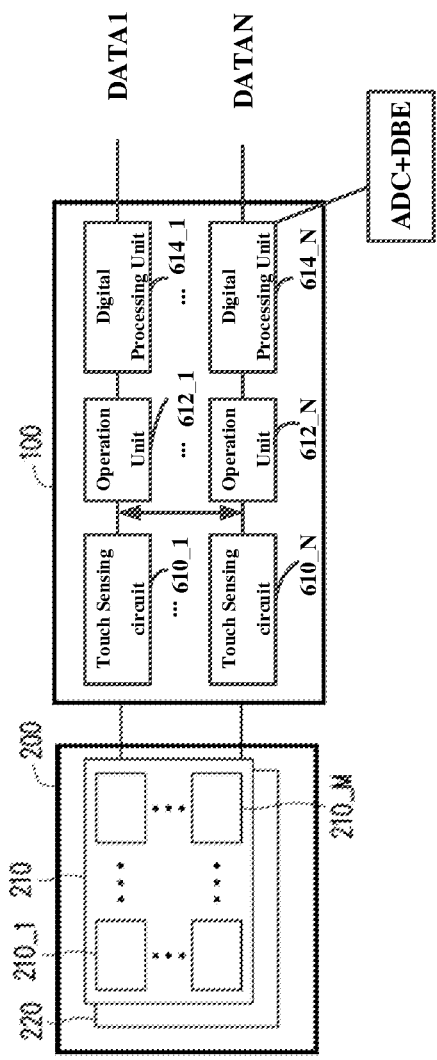
FIGS. 6A-6B show schematic diagrams of a touch sensing apparatus according to the embodiments of the present disclosure.
Figure 6B:
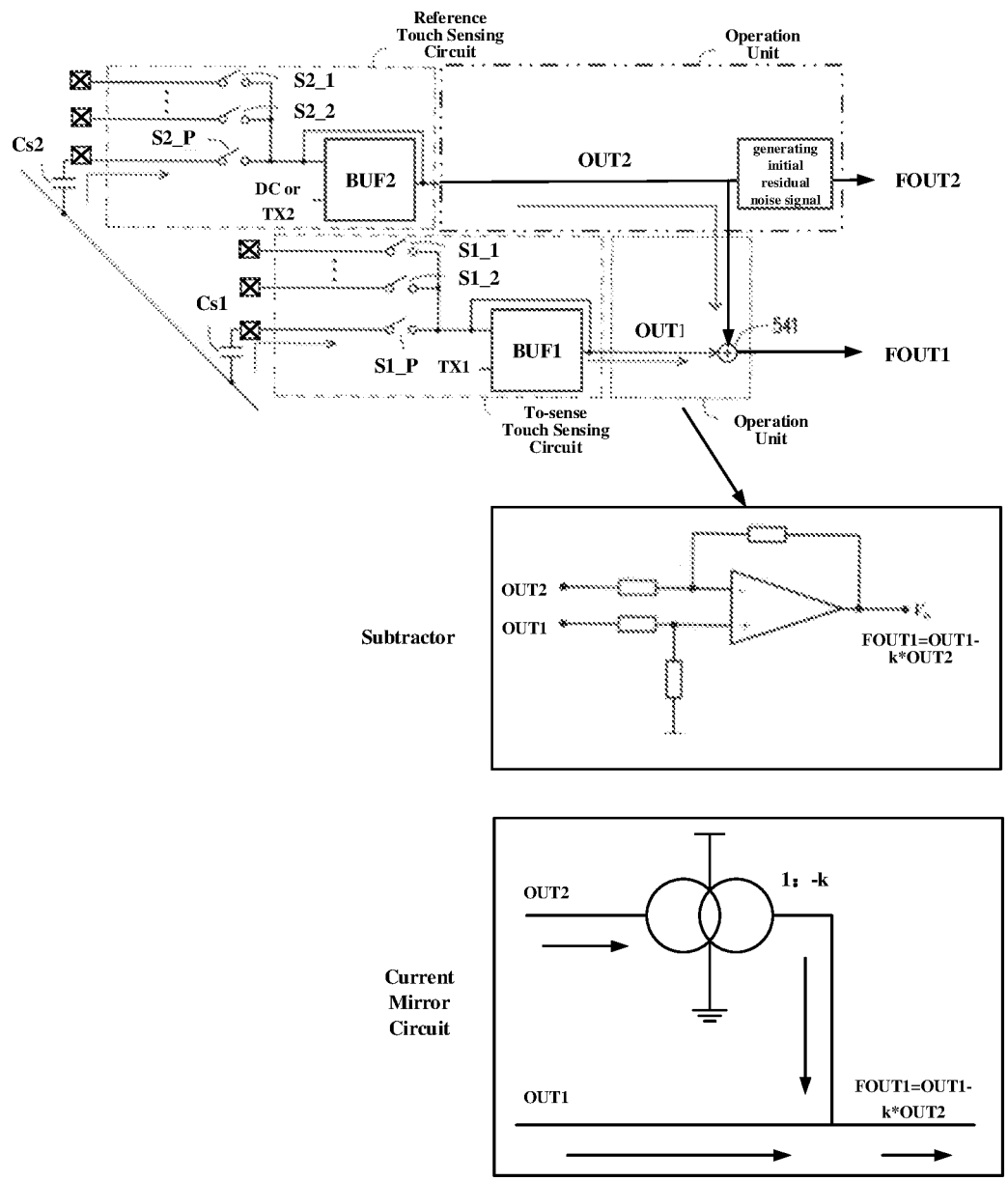

A schematic diagram of the above-mentioned subtraction process based on the subtractor circuit will be shown in FIG. 6B hereinafter. As shown in FIG. 6B, the first output signal (represented by OUT1) and the second output signal (represented by OUT2) are respectively input to both terminals of the subtractor circuit, and the subtractor circuit subtracts the two to obtain the differential signal, that is, FOUT1=OUT1−k*OUT2. Here, a preset coefficient k is related to the ratio of the area of the contact pad of the touch electrode of the touch sensitive cell corresponding to the to-sense touch sensing circuit relative to the area of the contact pad of the touch electrode of the touch sensitive cell corresponding to the reference touch sensing circuit, k being greater than 0.

Alternatively, the first output signal and the second output signal are current signals. At this time, the second output signal may be input to a mirror module in a current mirror circuit via an input terminal of the current mirror circuit, and the mirror module outputs an output signal with negative polarity to a superimposition module in the current mirror circuit; the first output signal may be input to the superimposition module via another input terminal of the current mirror circuit, to be superimposed with the output signal with negative polarity, and then output via an output terminal of the current mirror circuit.

A schematic diagram of the above-mentioned subtraction process based on the current mirror circuit is shown in FIG. 6B. The input terminal of the current mirror circuit receives the second output signal in the form of current, then the current mirror circuit generates a mirror current signal through a mirror module, and the mirror module outputs an output signal with negative polarity through a suitable grounding; another input terminal of the current mirror circuit receives the first output signal, and the first output signal is superimposed with the output signal with negative polarity (both in the form of current) through a superimposition module in the current mirror circuit, and the superimposed signal is output from the output terminal of the current mirror circuit. Obviously, the value of the superimposed signal is the value of the differential signal of the first output signal and the second output signal, that is, FOUT1=OUT1−k*OUT2. Similarly, the preset coefficient k is related to the ratio between the area of the contact pad of the touch electrode of the touch sensitive cell corresponding to the to-sense touch sensing circuit and the area of the contact pad of the touch electrode of the touch sensitive cell corresponding to the reference touch sensing circuit.

Alternatively, the first output signal and the second output signal may also be electric charge signals. The subtraction is performed on charges on self-capacitors of the touch sensitive cells corresponding to the to-sense touch sensing circuit and the reference touch sensing circuit to eliminate noise charges on the self-capacitors. The principle is similar to that of voltage or current, so it will not be repeated here.

In addition, the first output signal, the second output signal, and the corresponding differential signal are all analog signals, so they need to be converted into digital signals (for example, via an analog-to-digital converter (ADC)) to facilitate the processing of the subsequent digital back-end (the digital back-end includes a digital processing circuit with related specific functions, and the digital back-end may also be omitted, which is not limited in the present disclosure), and the converted or processed signals will be provided to the controller and the like for processing, to determine the touch position.

At the same time, due to the interference between the touch sensing circuits and the signal transmission paths or other paths may have other responses, after the differential signal (that is, the signal obtained after at least part of the noise caused by the display panel is eliminated, etc.) is obtained, the differential signal needs to be subjected to analog-to-digital conversion and subsequent digital processing to obtain a corresponding data signal, so that there will be other forms of noise signals (the noise signal in the corresponding data signal is collectively referred to as final residual noise signal). Therefore, the method that may eliminate the final residual noise should also be considered.

First consider how to obtain the value of the final residual noise signal. As described with reference to FIG. 1, the plurality of touch sensing circuits 110_1~110_N have a one-to-one correspondence with the plurality of operation units 112_1~112_N and the plurality of digital processing units 114_1~114_N (including analog-to-digital converters and digital back-ends, etc.), and each operation unit may perform subtraction on the signal of one input terminal and the signal of another input terminal (such as the first output signal and the second output signal). Therefore, a possible way is to subtract the existing second output signal output by the reference touch sensing circuit from itself through the operation unit (because the subtractor circuit is existing), thereby outputting an initial residual noise signal (for example, with a value of 0 or a relatively small value) from the output terminal of the operation unit, and then the initial residual noise signal is input to the corresponding digital processing unit, so that the value of the signal output by the subsequent digital processing unit is the value of the final residual noise signal. Then, for one or more to-sense touch sensing circuits corresponding to such a reference touch sensing circuit, subtraction can be performed on the digital signals obtained after processing one or more differential signals by the digital processing units and the above-mentioned final residual noise signal, the one or more differential signals being obtained by respectively performing subtraction through the operation units on the first output signals output by the to-sense touch sensing circuits and the second output signal, so that the final residual noise signal may be eliminated from the digital signal corresponding to each differential signal, thereby obtaining an accurate touch sensing result of the touch panel. For example, the digital signals obtained after these differential signals are processed by the digital processing units and the digital signal (final residual noise signal) obtained after the initial residual noise signal is processed by the digital processing unit are input to a subsequent controller, and the controller performs subtraction on each digital signal obtained based on differential signals and the digital signal obtained based on the initial residual noise signal, so that respective digital signals corresponding to the differential signals in which the final residual noise signal has been removed are obtained, thereby respective capacitance differences of capacitances sensed may be obtained according to the values of these digital signals, and then the touch position may be determined.

That is, step S340 may include: for each to-sense touch sensing circuit and the corresponding reference touch sensing circuit, a first digital signal is generated based on the second output signal output by the corresponding reference touch sensing circuit, for example, an initial residual noise signal is generated first, and the initial residual noise signal is processed to obtain the first digital signal (final residual noise signal); a differential signal between the first output signal output by the to-sense touch sensing circuit and the second output signal output by the corresponding reference touch sensing circuit is processed into a second digital signal; and subtraction is performed on the second digital signal and the first digital signal, to obtain a differential digital signal in which the final residual noise signal caused by the processing process has been removed; and the capacitance differences of capacitances sensed by the to-sense touch sensing circuit and the corresponding reference touch sensing circuit are obtained based on the differential digital signal.

Generally, as mentioned above, for all touch sensitive cells, if the areas of the contact pads of their corresponding touch electrodes are the same, it is default that they are subject to the same external interference (for example, display noise, common mode noise, etc.). The equivalent circuit of the respective touch sensing circuits are shown in FIG. 5A-5B (one pair is shown).

Figure 5A:
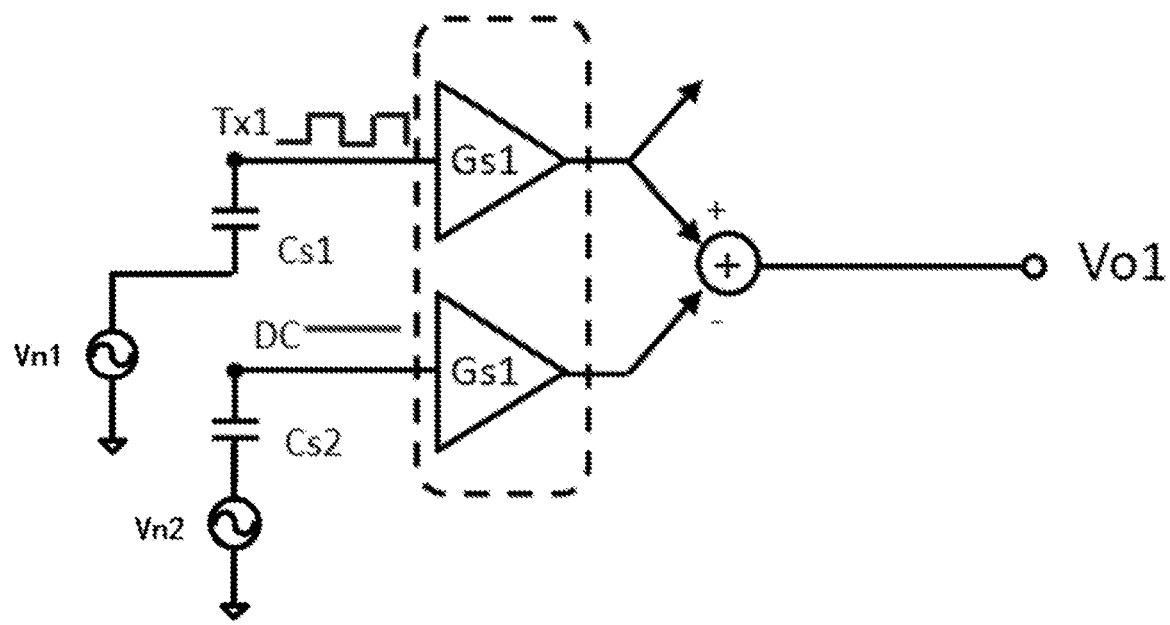
FIGS. 5A-5B show equivalent circuits when a pair of touch sensing circuits perform touch sensing according to the embodiments of the present disclosure.
Figure 5B:
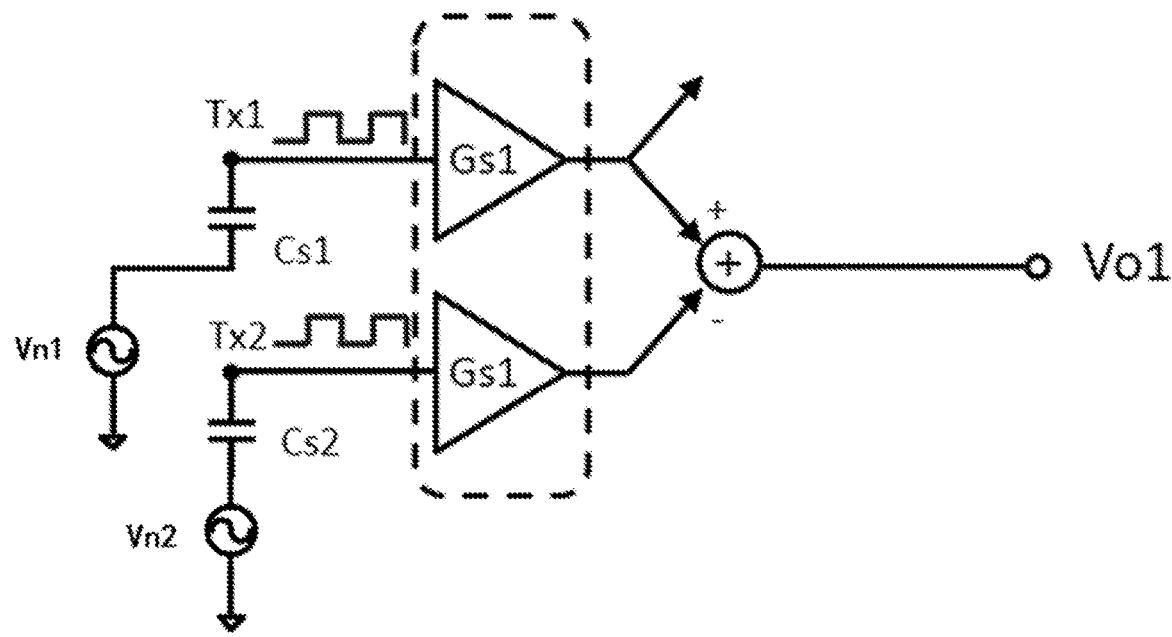

FIGS. 5A-5B show equivalent circuits when a pair of touch sensing circuits perform touch sensing according to the embodiments of the present disclosure. In FIG. 5A, Cs1 is the self-capacitance value of one touch sensitive cell corresponding to the to-sense touch sensing circuit, Cs2 is the self-capacitance value of one touch sensitive cell corresponding to the reference touch sensing circuit, and Vn1 and Vn2 are equivalent noise voltages of the noise signals subjected by touch sensitive cells corresponding to the to-sense touch sensing circuit and the reference touch sensing circuit (for ease of description, the corresponding noise signals are also represented by Vn1 and Vn2 respectively), respectively. TX1 is the touch excitation signal applied to the to-sense touch sensing circuit, TX2 (FIG. 5B) or DC (FIG. 5A) is the touch reference signal applied to the reference touch sensing circuit, and Gs is the equivalent conductance of each touch sensing circuit. Although only one pair of touch sensing circuits are shown in FIG. 5, those skilled in the art should understand that this is only to describe the embodiments of the present disclosure more clearly, and in fact, more pairs of touch sensing circuits may be included, and one reference touch sensing circuit may correspond to a plurality of to-sense touch sensing circuits.

In many cases, the self-capacitances of all touch sensitive cell are equal (the areas of the touch pads of the touch electrodes are equal). In addition, a touch driving signal (that is, the touch excitation signal TX1 with the amplitude of Vtx1 for the to-sense touch sensing circuit or the touch reference signal DC or the TX2 with the amplitude of Vtx2 for the reference touch sensing circuit, TX1 and TX2 are the same variable signal) is applied to each touch sensitive cell.

In the case that the touch reference signal is the DC signal, as shown in FIG. 5A, since Cs1=Cs2, and Vn1 and Vn2 are generally close and have the same phase, the following formula (1) may be obtained:

$$Vo1 = Gs \times (Vtx1 \times Cs1 + Vn1 \times Cs1 - Vn2 \times Cs2) \quad (1)$$

Since Cs1 is generally equal to Cs2, and Vn1 is generally equal to Vn2, the value of Vn1×Cs1−Vn2×Cs2 in formula (1) is 0 or a small value close to 0, that is, the noise signal is removed, so that Vo1 generally corresponds to the voltage of the touch excitation signal. If Cs1 changes when a touch occurs, the voltage of Vo1 will change significantly, which may be used to determine the capacitance difference of capacitances sensed by the touch sensing circuits (the to-sense touch sensing circuit and the reference touch sensing circuit), and thus by comparing it with the capacitance difference when the touch has not occurred, it may be determined whether a touch occurs at the touch sensitive cell corresponding to the to-sense touch sensing circuit.

In the case that the touch reference signal is the variable signal TX2, as shown in FIG. 5B, since Cs1=Cs2, TX1 and TX2 are the same variable signal, and since Vn1 and Vn2 are generally close and have the same phase, the following formula (2) may be obtained, $$Vo1 = Gs \times (Vtx1 \times Cs1 + Vn1 \times Cs1 - (Vtx2 \times Cs2 + Vn2 \times Cs2)) = \quad (2)$$
$$Gs \times (Vtx1 \times Cs1 - Vtx2 \times Cs2) + Gs \times (Vn1 \times Cs1 - Vn2 \times Cs2)$$

Since Cs1 is generally equal to Cs2, and Vn1 is generally equal to Vn2, the value of Vn1×Cs1−Vn2×Cs2 in formula (2) is 0 or a small value close to 0, that is, the noise signal is removed, so Vo1 only needs to correspond to the voltage difference (which may have a relative large dynamic range) between the voltage of the touch excitation signal and the voltage of the touch reference signal. When Cs1 changes, the voltage of Vo1 will change, which may be used to determine the capacitance difference of capacitances sensed by the touch sensing circuits (the to-sense touch sensing circuit and the reference touch sensing circuit), and thus by comparing it with the capacitance difference when the touch has not occurred, it may be determined whether a touch occurs at the touch sensitive cell corresponding to the to-sense touch sensing circuit.

However, as mentioned above, in some cases, the self-capacitances of some touch sensitive cells are not equal. Therefore, for each pair of touch sensing circuits (one to-sense touch sensing circuit and one reference touch sensing circuit), if the areas of contact pads of the respective touch sensitive cells are not equal, Cs1 and Cs2 will be not equal obviously. Or, according to the different positions of the touch sensitive cells corresponding to the to-sense touch sensing circuit and the reference touch sensing circuit and the areas of the contact pads thereof, even though Cs1 is basically equal to Cs2, Vn1 and Vn2 may not be equal. Or, Cs1 and Cs2 are not equal, and Vn1 and Vn2 are not equal, either.

It may be known from formulas (1) and (2) that if Cs1 and Cs2 are not equal, and/or Vn1 and Vn2 are not equal, the noise signal will not be eliminated well if no modification is made. These cases are described in detail below.

Therefore, the embodiments of the present disclosure propose a method of multiplying the second output signal output by the reference touch sensing circuit by a coefficient k, and then performing the subtraction on the first output signal output by the corresponding to-sense touch sensing circuit and the second output signal multiplied by k. k may be related to the ratio between the self-capacitance value of the touch sensitive cell corresponding to the to-sense touch sensing circuit and the self-capacitance value of the touch sensitive cell corresponding to the reference touch sensing circuit (that is, the ratio between the areas of the contact pads described above). Similarly, it may be considered that k is related to the ratio of Vn1 and Vn2. In addition, when the phase difference between Vn1 and Vn2 is 180°, k is a negative value. The following example takes Vn1 and Vn2 being equal and in phase as an example first. The process for the case that Vn1 and Vn2 are unequal or non-in-phase may also be derived similarly. The main principle is to choose an appropriate value of k so that the value of the noise part in the formula is 0.

For example, derivation is made in a similar manner to formula (1), assuming that Cs1/Cs2=k1, k1 can be regarded as the above ratio of the areas of contact pads, in the case that the touch reference signal is the DC signal, when the second output signal output by the reference touch sensing circuit is multiplied by k, the following formula (3) may be obtained:

$$Vo1 = Gs \times (Vtx1 \times Cs1 + Vn1 \times Cs1 - k \times Vn2 \times Cs2) = \quad (3)$$

$$Gs \times (Vtx1 \times Cs1 + Vn1 \times k1 \times Cs2 - k \times Vn2 \times Cs2)$$

Since Vn1 is generally equal to Vn2, by setting k=k1, the value of k1×Vn1×Cs2−k×Vn2×Cs2 in formula (3) is 0 or a small value close to 0, that is, the noise signal is removed, so that Vo1 generally corresponds to the voltage of the touch excitation signal. Cs1 changes when a touch occurs, so the voltage of Vo1 will change significantly, which may be used to determine the capacitance difference of capacitances sensed by the touch sensing circuits (the to-sense touch sensing circuit and the reference touch sensing circuit), and thus by comparing it with the capacitance difference when the touch has not occurred, it may be determined whether a touch occurs at the touch sensitive cell corresponding to the to-sense touch sensing circuit.

In the case that the touch reference signal is the second variable signal, it may be derived in a similar manner to the formula (2) that assuming that Cs1/Cs2=k1, in the case that the touch reference signal is the DC signal, when the second output signal output by the reference touch sensing circuit is multiplied by k, the following formula (4) may be obtained:

$$Vo1 = Gs \times (Vtx1 \times Cs1 + Vn1 \times Cs1 - k*(Vtx2 \times Cs2 + Vn2 \times Cs2)) = \quad (4)$$

$$Gs*(Vtx1 \times Cs1 + Vn1 \times k1 \times Cs2 - k*(Vtx2 \times Cs2 + Vn2 \times Cs2)) =$$

$$Gs \times [(Vtx1 \times Cs1 - k \times Vtx2 \times Cs2) + (k1 \times Vn1 \times Cs2 - k \times Vn2 \times Cs2)]$$

Since Vn1 is generally equal to Vn2, by setting k=k1, the value of k1×Vn1×Cs2−k×Vn2×Cs2 in formula (4) is 0 or a small value close to 0, that is, the noise signal is removed, and Vtx2=Vtx1/k1 can be selected to make the value of (Vtx1×Cs1−k×Vtx2×Cs2) to be 0 or a small value close to 0, so Vo1 only needs to correspond to the voltage difference (which may have a relative large dynamic range) between the voltage of the touch excitation signal and the voltage of the touch reference signal. When Cs1 is assumed to change, the voltage of Vo1 will change, which may be used to determine the capacitance difference of capacitances sensed by the touch sensing circuits (the to-sense touch sensing circuit and the reference touch sensing circuit), and thus by comparing it with the capacitance difference when the touch has not occurred, it may be determined whether a touch occurs at the touch sensitive cell corresponding to the to-sense touch sensing circuit.

Optionally, the touch excitation signal and the touch reference signal may be different in at least one of frequency, phase, and amplitude. Since the properties of the touch excitation signal and the touch reference signal and the structure of each touch sensing circuit are known, when no touch occurs, a theoretical value of the difference signal obtained based on the first and second output signals of the touch sensing circuits (the to-sense touch sensing circuit and the reference touch sensing circuit) may be predetermined. When a touch occurs, the value of the difference signal (at least part of the noise has been eliminated by setting k=k1 as mentioned above) will change, so that it can be determined that whether a touch occurs at the touch sensitive cell corresponding to the to-sense touch sensing circuit.

Meanwhile, in this case, phases, frequencies, waveforms, etc. of the touch excitation signal and the touch reference signal can be made the same, and for amplitude, by setting Vtx1=Vtx2, the value of Vtx1×Cs1−k×Vtx2×Cs2 is 0 or a small value close to 0, thereby the value of Vo1 is close to 0 when no touch occurs, and when a touch occurs subsequently, Vo1 becomes a value significantly greater than 0, which is very convenient for sensing, improves the accuracy of sensing, and reduces the voltage detection range of touch detection results.

Similarly, assuming that Cs1 and Cs2 are equal, but Vn1 and Vn2 are not equal, that is, Vn1/Vn2=k2 (where the value of k2 is empirically determined according to the position of each touch sensitive cell and the area of the contact pad of the touch sensitive cell in this disclosure), when the touch reference signal is DC, the following formula can be obtained:

$$Vo1 = Gs \times (Vtx1 \times Cs1 + Vn1 \times Cs1 - k \times Vn2 \times Cs2) = \quad (5)$$

$$Gs \times (Vtx1 \times Cs1 + k2 \times Vn2 \times Cs1 - k \times Vn2 \times Cs2)$$

Because Cs1 is basically equal to Cs2, by making k=k2, the value of k2×Vn2×Cs1−k×Vn2×Cs2 in formula (5) is 0 or a small value close to 0, that is, that is, the noise signal is removed, so Vo1 generally corresponds to the voltage of the touch excitation signal. Cs1 changes when a touch occurs, so the voltage of Vo1 will change significantly, which may be used to determine the capacitance difference of capacitances sensed by the touch sensing circuits (the to-sense touch sensing circuit and the reference touch sensing circuit), and thus by comparing it with the capacitance difference when the touch has not occurred, it may be determined whether a touch occurs at the touch sensitive cell corresponding to the to-sense touch sensing circuit.

When the touch reference signal is the second variable signal, the following formula can be obtained:

$$Vo1 = Gs \times (Vtx1 \times Cs1 + Vn1 \times Cs1 - k*(Vtx2 \times Cs2 + Vn2 \times Cs2)) = \quad (6)$$
$$Gs \times (Vtx1 \times Cs1 + Vn1 \times k1 \times Cs2 - k*(Vtx2 \times Cs2 + Vn2 \times Cs2)) =$$
$$Gs \times [(Vtx1 \times Cs1 - k \times Vtx2 \times Cs2) + (k2 \times Vn2 \times Cs1 - k \times Vn2 \times Cs2)]$$

Since Cs1 is basically equal to Cs2 and Vn1/Vn2=k2, by making k=k2, the value of k1×Vn1×Cs2−k×Vn2×Cs2 in formula (6) is 0 or a small value close to 0, that is, the noise signal is removed, and then, Vtx2/Vtx1=1/k2 can be selected to make the value of Vtx1×Cs1−k×Vtx2×Cs2 to be 0 or a small value close to 0, and when a touch occurs subsequently, Vo1 becomes a value significantly greater than 0, which is very convenient for sensing, improves the accuracy of sensing, and reduces the voltage detection range of touch detection results.

In addition, in a case where Cs1 and Cs2 are not equal (Cs1/Cs2=k1) and Vn1 and Vn2 are not equal (Vn1/Vn2=k2), a similar derivation can be made for this case, and it can be derived that k=k1×k2 and Vtx2/Vtx1=1/k2.

That is to say, by reasonably setting the preset coefficient k and the relationship between the values of Vtx1 and Vtx2, even if Cs1 and Cs2 are not equal and/or Vn1 and Vn2 are not equal, noise components in the voltage Vo1 can be restrained, and the value of Vo1 is 0 or a small value close 0 when no touch occurs, and Vo1 becomes a value significantly larger than 0 when a touch occurs later, so it is very convenient for sensing, improves the accuracy of sensing, and reduces the voltage detection range of touch detection results.

Therefore, the touch sensing method for the touch panel is described above with reference to FIGS. 3A-5B. By determining the to-sense touch sensing circuit and the reference touch sensing circuit, the signal with at least a part of noise removed may be obtained by performing subtraction on the first output signals output by the to-sense touch sensing circuit and the second output signal output by the corresponding reference touch sensing circuit, and the sensed capacitance difference may be obtained based on the signal, so as to determine the touch position. In addition, it is also considered to eliminate the residual noise signal introduced in the digital processing process, thereby improving the accuracy of touch sensing. Finally, considering that the self-capacitances (mutual capacitances) of respective touch sensitive cells are unequal and/or the values of noise signals which the touch sensitive cells are subjected to are unequal, the touch excitation signal and the touch reference signal that are applied to the touch sensitive cells by the corresponding to-sense touch sensing circuit and the reference touch sensing circuit are also adjusted to facilitate the sensing and further improve the accuracy of the sensing.

Correspondingly, the embodiments of the present disclosure also provide a touch sensing apparatus for the touch panel. FIGS. 6A-6B show schematic diagrams of a touch sensing apparatus 600 according to the embodiments of the present disclosure. The touch sensing apparatus 600 has a structure similar to that of the touch sensing apparatus 100 described with reference to FIG. 1, except that more details are shown. The touch sensing apparatus 600 will be described in more detail below.

The touch sensing apparatus 600 senses a plurality of touch sensitive cells 210_1 to 210_M included in a touch panel 210, where M is a positive integer.

In the embodiments of the present disclosure, the touch sensing apparatus 600 may include a plurality of touch sensing circuits (610_1 to 610_N) and a plurality of operation units (612_1 to 612_N) in a one-to-one correspondence, and N is a positive integer. At least one touch sensing circuit is used as a first number of to-sense touch sensing circuits, at least one touch sensing circuit is used as a second number of reference touch sensing circuits, and each to-sense touch sensing circuit is corresponding to one reference touch sensing circuit. For example, the first number of to-sense touch sensing circuits correspond to the same one reference touch sensing circuit, or the first number of to-sense touch sensing circuits correspond to different reference touch sensing circuits. Several specific correspondence relationships and examples have been described in detail above, and will not be repeated here.

In addition, each to-sense touch sensing circuit and each reference touch sensing circuit both correspond to only one touch sensitive cell, or each to-sense touch sensing circuit and each reference touch sensing circuit both correspond to multiple touch sensitive cells of the same number.

A first terminal of each to-sense touch sensing circuit receives a touch excitation signal (TX1), and a second terminal thereof applies the touch excitation signal (TX1) to a corresponding touch sensitive cell and receives touch sensing signal from the corresponding touch sensitive cell, and an output terminal thereof outputs a first output signal. Since there is the first number of to-sense touch sensing circuits, the first number of first output signals may be obtained.

A first terminal of each reference touch sensing circuit receives a touch reference signal (DC/TX2), and a second terminal thereof applies the touch reference signal (DC/TX2) to a corresponding touch sensitive cell and receives a reference sensing signal from the corresponding touch sensitive cell, and an output terminal thereof outputs a second output signal, where the touch reference signal (DC/TX2) and the touch excitation signal (TX1) are different signals. Since there is the second number of reference touch sensing circuits, the second number of second output signals may be obtained.

For example, the touch excitation signal is a first variable signal (for example, a signal with variable amplitude and/or frequency), and the touch reference signal is a direct current signal or a second variable signal different from the first variable signal.

For the selection of the touch excitation signal and the touch reference signal, when the touch excitation signal is the first variable signal and the touch reference signal is the DC signal, the second output signal output by the reference touch sensing circuit only includes a noise signal, while the first output signal output by the to-sense touch sensing circuit includes the noise signal and a first touch signal. Therefore, if the two noise signals are basically the same, as will be described later, when the operation unit corresponding to the to-sense touch sensing circuit performs subtraction on the first output signal and the second output signal, the signal output by the operation unit only includes the first touch signal. When the touch excitation signal is the first variable signal and the touch reference signal is the second variable signal, the second output signal output by the reference touch sensing circuit includes the noise signal and a second touch signal, while the first output signal output by the to-sense touch sensing circuit includes the noise signal and the first touch signal. Therefore, if the two noise signals are basically the same, as will be described later, when the operation unit corresponding to the to-sense touch sensing circuit performs subtraction on the first output signal and the second output signal, the signal output by the operation unit is the differential signal between the voltage, current or electric charge signal corresponding to the first touch signal and the voltage, current or electric charge signal corresponding to the second touch signal. At the same time, setting the second variable signal to be different from the first variable signal may be better suited to situations where the self-capacitance values of the touch sensitive cells are unequal. This has been described in detail in the content described with reference to FIGS. 3A-5B, so it will not be repeated here.

Each to-sense touch sensing circuit and each reference touch sensing circuit may both correspond to only one touch sensitive cell, or each to-sense touch sensing circuit and each reference touch sensing circuit may both correspond to multiple touch sensitive cells of the same number. For example, each to-sense touch sensing circuit may correspond to only one touch sensitive cell (that is, apply the touch excitation signal to the one touch sensitive cell and obtain the touch sensing signal from it), and the reference touch sensing circuit corresponding to each to-sense touch sensing circuit may correspond to another touch sensitive cell. For example, each to-sense touch sensing circuit may correspond to the touch sensitive cells on the same row or column, and correspondingly, the reference touch sensing circuit corresponding to the to-sense touch sensing circuit may correspond to the touch sensitive cells on another row or column.

Therefore, in this case, FIG. 6B shows more details of the touch sensing circuits (a pair) and the operation units. As shown in FIG. 6B, each to-sense touch sensing circuit includes a buffer (BUF1) and a first group of switches (S1_1 . . . S1_P), and each reference touch sensing circuit includes a buffer (BUF2) and a second group of switches (S2_1 . . . S2_P), the number of switches in the first group of switches is the same as the number of switches in the second group of switches. First terminals of the switches in the first group of switches are all connected to a second terminal of the buffer of the same to-sense touch sensing circuit, and second terminals of the switches in the first group of switches are respectively connected to respective touch sensitive cells corresponding to the to-sense touch sensing circuit in a one-to one manner, and a first terminal and an output terminal of the buffer of the to-sense touch sensing circuit respectively serve as a first terminal and an output terminal of the to-sense touch sensing circuit. First terminals of the switches in the second group of switches are all connected to a second terminal of the buffer of the same reference touch sensing circuit, and second terminals of the switches in the second group of switches are respectively connected to respective touch sensitive cells corresponding to the reference touch sensing circuit in a one-to one manner, and a first terminal and an output terminal of the buffer of the reference touch sensing circuit respectively serve as a first terminal and an output terminal of the reference touch sensing circuit.

The simultaneous or sequential application of the touch excitation signal or touch reference signal to respective touch sensitive cells and simultaneous or sequential reception of sensing signals may be realized by simultaneously or sequentially performing switch control on respective switches in the first group or the second group of switches.

The plurality of operation units ($612\_1$~$612\_N$) calculate, according to the first number of first output signals and the second number of second output signals, a differential signal between the output signals of each to-sense touch sensing circuit and the corresponding reference touch sensing circuit, the differential signal being associated with a capacitance difference of capacitances sensed by the to-sense touch sensing circuit and the corresponding reference touch sensing circuit.

For example, each to-sense touch sensing circuit provides the first output signal to one corresponding operation unit, and the reference touch sensing circuit corresponding to the to-sense touch sensing circuit will also provide the second output signal to one operation unit corresponding to the reference touch sensing circuit and to the operation unit corresponding to the to-sense touch sensing circuit. The operation unit corresponding to the to-sense touch sensing circuit performs subtraction on the first output signal and the second output signal to obtain the differential signal. The value of the differential signal is associated with the capacitance difference of capacitances sensed by the to-sense touch sensing circuit and the corresponding reference touch sensing circuit, so the differential signal may be used to obtain the capacitance difference, as the operations performed by the digital processing units and subsequent controller as described in the context.

As mentioned above, in some cases, for each pair of the to-sense touch sensing circuit and the reference touch sensing circuit, the areas of contact pads of the touch electrodes of their respective touch sensitive cells may not be equal, so it is necessary to multiply the second output signal output by the reference touch sensing circuit by the preset coefficient, and then perform the subtraction on the first output signal and the second output signal multiplied by the preset coefficient, to obtain the differential signal, where, as mentioned above, the preset coefficient is related to the area ratio between the areas of the contact pads of the touch electrodes of the touch sensitive cells respectively corresponding to the to-sense touch sensing circuit and the corresponding reference touch sensing circuit.

In addition, when the touch excitation signal received by the to-sense touch sensing circuit and the touch reference signal received by the corresponding reference touch sensing circuit are two variable signals, and in a case where only amplitudes of the two variable signals are different, a ratio of the amplitudes of the two variable signals is related to the ratio between the values of noise signals which the touch sensitive cells respectively corresponding to the to-sense touch sensing circuit and the corresponding reference touch sensing circuit are subjected to and related to the area ratio between the areas of the contact pads of the touch electrodes.

For example, the first output signal and the second output signal may be voltage signals. Therefore, as shown in FIG. 6B, each operation unit includes a subtractor circuit, and two input terminals of the subtractor circuit receive the first output signal output by the to-sense touch sensing circuit and the second output signal output by the corresponding reference touch sensing circuit for subtraction, so as to output the differential signal. The value of the differential signal is equal to the difference between the value of the first output signal and the value of the second output signal (multiplied by the preset coefficient k).

For another example, the first output signal and the second output signal may be current signals. Therefore, as shown in FIG. 6B, a first input terminal of the current mirror circuit receives a second output signal in the form of current, then generates a mirror current through a mirror module in the current mirror circuit, and outputs an output signal with negative polarity from the mirror module of the current mirror circuit. A second input terminal of the current mirror circuit receives the first output signal, and then a superposition module in the current mirror circuit superposes the first output signal with the output signal with negative polarity (both in the form of current), to output the superimposed signal from the output terminal of the current mirror circuit. It is obvious that the value of the superimposed signal is value of the differential signal obtained based on the first output signal and the second output signal.

Similarly, since the signals output by the operation units are all analog signals, it is necessary to convert the signals into digital signals and the touch sensing apparatus 600 provide the digital signals to the subsequent controller or the like for processing, to determine the capacitance difference of capacitances sensed by each pair of touch sensing circuits, and then determine the touch position.

Therefore, the touch sensing apparatus 600 also includes a plurality of digital processing units (614_1~614_N) corresponding to the plurality of touch sensing circuits (610_1~610_N) and the plurality of operation units (612_1~612_N) in one-to-one correspondence, which is configured to digitally process the signals output by the operation units, and finally output digital signals DATA1~DATAN.

Each digital processing unit may be used to perform, for example, analog-to-digital conversion and other digital processing, so it may include, for example, an analog-to-digital converter (ADC) and a digital back-end (DBE) circuit (the digital back-end circuit includes a digital processing circuit with related specific functions, the digital back-end circuit may also be omitted, which is not limited in this disclosure).

Similarly, in order to eliminate residual noise signal introduced in the digital processing process, the touch sensing apparatus 600 may also be configured as follows.

For each pair of the to-sense touch sensing circuit and the reference touch sensing circuit, the operation unit corresponding to the reference touch sensing circuit is used to obtain an initial residual noise signal based on the second output signal output by the reference touch sensing circuit, and the digital processing unit corresponding to the reference touch sensing circuit processes the initial residual noise signal into a first digital signal, as a final residual noise signal; and the operation unit corresponding to the to-sense touch sensing circuit is used to obtain the first output signal output by the to-sense touch sensing circuit and the second output signal output by the corresponding reference touch sensing circuit, and obtain the differential signal by calculation, and the digital processing unit corresponding to the to-sense touch sensing circuit processes the differential signal into a second digital signal.

The second digital signal and the first digital signal are provided to a controller, and the controller may perform subtraction on the two digital signals to obtain a difference digital signal. The difference digital signal no longer includes the final residual noise signal and is associated with the capacitance difference of capacitances sensed by the to-sense touch sensing circuit and the corresponding reference touch sensing circuit.

In addition, the present disclosure further provides a touch sensing apparatus for a touch panel. The touch panel includes a plurality of touch sensitive cells, and the touch sensing apparatus has a similar structure to the touch sensing apparatus described with reference to FIGS. 1 and 6A-6B.

The touch sensing apparatus may include a plurality of touch sensing circuits and a plurality of operation units in a one-to-one correspondence, wherein at least one touch sensing circuit of a plurality of touch sensing circuits is determined as at least one to-sense touch sensing circuit, and at least one touch sensing circuit of the plurality of touch sensing circuits is determined as at least one reference touch sensing circuit, wherein each touch sensing circuit has a corresponding touch sensitive cell, and each to-sense touch sensing circuit has a corresponding reference touch sensing circuit. Each to-sense touch sensing circuit transmits a touch excitation signal to a corresponding touch sensitive cell, and obtains at least one touch sensing signal; each reference touch sensing circuit transmits a touch reference signal to a corresponding touch sensitive cell, and obtains at least one reference sensing signal, wherein the touch reference signal and the touch excitation signal are different signals, and the touch reference signal (DC/TX2) and the touch excitation signal (TX1) are different signals. The plurality of operation units obtain at least one sensing signal according to the at least one reference sensing signal and the at least one touch sensing signal, wherein the at least one sensing signal is related to capacitance differences of capacitances sensed by the at least one to-sense touch sensing circuit and the at least one reference touch sensing circuit.

More details of the structure and operation of the to-sense touch sensing circuit and the reference touch sensing circuit, as well as the corresponding operation unit and digital processing unit (including ADC+DBE, for example), are the same as or similar to the relevant parts described above with reference to FIGS. 1-6B, so the description will not be repeated here.

Therefore, through the touch sensing apparatus of the embodiments of the present disclosure, by determining the to-sense touch sensing circuit and the reference touch sensing circuit, the signal with at least a part of noise removed may be obtained by performing subtraction on the first output signal output by the to-sense touch sensing circuit and the second output signal output by the corresponding reference touch sensing circuit, and the sensed capacitance difference may be obtained based on the signal, so as to determine the touch position. In addition, it is also considered to eliminate the residual noise signal introduced in the digital processing process, thereby improving the accuracy of touch sensing. Finally, considering that the self-capacitances (mutual capacitances) of respective touch sensitive cells are unequal and/or the values of noise signals which the touch sensitive cells are subjected to are unequal, the touch excitation signal and the touch reference signal that are applied to the touch sensitive cells by the corresponding to-sense touch sensing circuit and the reference touch sensing circuit are also adjusted to facilitate the sensing and further improve the accuracy of the sensing.

According to yet another aspect of the present disclosure, there is also provided an electronic device including a touch panel, a touch sensing apparatus, and a controller.

The touch panel includes a plurality of touch sensitive cells.

The touch sensing apparatus may be any touch sensing apparatus described above, including but not limiting to the touch sensing apparatus with reference to FIGS. 6A-6B.

The controller determines the touch position based on the signals provided from the touch sensing apparatus, for example, based on the digital signals, determines a plurality of capacitance differences of capacitances sensed by respective pairs of touch sensing circuits in the touch sensing apparatus, so as to determine the touch position based on respective capacitance differences.

Although the present invention has been disclosed in the above embodiments, it is not intended to limit the present invention. Anyone with ordinary knowledge in the relevant technical field may make some changes and modifications without departing from the spirit and scope of the present invention. Therefore, the protection scope of the present invention shall be subject to those defined by the appended claims.

What is claimed is:

1. A touch sensing apparatus for a touch panel, wherein the touch panel includes a plurality of touch sensitive cells, and the touch sensing apparatus comprises: a plurality of touch sensing circuits and a plurality of operation units in a one-to-one correspondence, wherein at least one touch sensing circuit is used as a first number of to-sense touch sensing circuits, at least one touch sensing circuit is used as a second number of reference touch sensing circuits, each touch sensing circuit has a corresponding touch sensitive cell, and each to-sense touch sensing circuit has a corresponding reference touch sensing circuit;

a first terminal of each to-sense touch sensing circuit receives a touch excitation signal (TX1), and a second terminal thereof applies the touch excitation signal (TX1) to a corresponding touch sensitive cell and receives a touch sensing signal from the corresponding touch sensitive cell, and an output terminal thereof outputs a first output signal;

a first terminal of each reference touch sensing circuit receives a touch reference signal (DC/TX2), and a second terminal thereof applies the touch reference signal (DC/TX2) to a corresponding touch sensitive cell and receives a reference sensing signal from the corresponding touch sensitive cell, and an output terminal thereof outputs a second output signal, wherein the touch reference signal (DC/TX2) and the touch excitation signal (TX1) are different signals; and the plurality of operation units calculate, according to a first number of first output signals and a second number of second output signals, a differential signal between the output signals of each to-sense touch sensing circuit and its corresponding reference touch sensing circuit, the differential signal being associated with a capacitance difference of capacitances sensed by the to-sense touch sensing circuit and the corresponding reference touch sensing circuit, wherein each touch sensing circuit includes a buffer and a group of switches, wherein, first terminals of the switches in the group of switches are all connected to a second terminal of the buffer of the touch sensing circuit, and second terminals of the switches in the group of switches are respectively connected to respective touch sensitive cells corresponding to the touch sensing circuit in a one-to one manner, and a first terminal and an output terminal of the buffer of the touch sensing circuit respectively serve as a first terminal and an output terminal of the touch sensing circuit.

2. The touch sensing apparatus according to claim 1, wherein, the first number of to-sense touch sensing circuits correspond to a same one reference touch sensing circuit, or, the first number of to-sense touch sensing circuits correspond to different reference touch sensing circuits.

3. The touch sensing apparatus according to claim 1, wherein the touch excitation signal is a first variable signal, and the touch reference signal is a direct current signal or a second variable signal different from the first variable signal.

4. The touch sensing apparatus according to claim 1, wherein each to-sense touch sensing circuit corresponds to a plurality of touch sensitive cells on one row or one column, and its corresponding reference touch sensing circuit corresponds to a plurality of touch sensitive cells on one row or one column.

5. The touch sensing apparatus according to claim 1, wherein, for each to-sense touch sensing circuit, the operation unit corresponding to the to-sense touch sensing circuit performs subtraction on the first output signal output by the to-sense touch sensing circuit and the second output signal output by its corresponding reference touch sensing circuit, to obtain the differential signal.

6. The touch sensing apparatus according to claim 5, wherein the first output signal and the second output signal are voltage signals, and each operation unit includes a subtractor, and two input terminals of the subtractor in the operation unit corresponding to each to-sense touch sensing circuit receive the first output signal output by the to-sense touch sensing circuit and the second output signal output by the reference touch sensing circuit corresponding to the to-sense touch sensing circuit, to output the differential signal.

7. The touch sensing apparatus according to claim 5, wherein the first output signal and the second output signal are current signals, and each operation unit includes a current mirror circuit, wherein, the current mirror circuit in the operation unit corresponding to each to-sense touch sensing circuit receives the second output signal output by the reference touch sensing circuit corresponding to the to-sense touch sensing circuit, and outputs an output signal with negative polarity;

wherein, the first output signal output by the to-sense touch sensing circuitry is superimposed with the output signal with negative polarity, to obtain the differential signal.

8. The touch sensing apparatus according to claim 1, further comprising digital processing units corresponding to the plurality of touch sensing circuits and the plurality of operation units in a one-to-one manner, wherein: for each to-sense touch sensing circuit and the corresponding reference touch sensing circuit, the operation unit corresponding to the reference touch sensing circuit is used to process the second output signal output by the reference touch sensing circuit, and the digital processing unit corresponding to the reference touch sensing circuit processes the processed second output signal into a first digital signal; and the operation unit corresponding to the to-sense touch sensing circuit is used to obtain the first output signal output by the to-sense touch sensing circuit and the second output signal output by the reference touch sensing circuit, and output a differential signal, and the digital processing unit corresponding to the to-sense touch sensing circuit processes the differential signal into a second digital signal, wherein, the second digital signal and the first digital signal are provided to a controller for subtraction, to obtain a differential digital signal, and the differential digital signal is associated with a capacitance difference of capacitances sensed by the to-sense touch sensing circuit and the reference touch sensing circuit.

9. An electronic device, comprising:
a touch panel;
a touch sensing apparatus for the touch panel according to claim 8; and
a controller configured to determine a touch position based on a signal output by the touch sensing apparatus.

10. A touch sensing apparatus for a touch panel, wherein the touch panel includes a plurality of touch sensitive cells, and the touch sensing apparatus comprises: a plurality of touch sensing circuits and a plurality of operation units in a one-to-one correspondence, wherein at least one touch sensing circuit is used as a first number of to-sense touch sensing circuits, at least one touch sensing circuit is used as a second number of reference touch sensing circuits, each touch sensing circuit has a corresponding touch sensitive cell, and each to-sense touch sensing circuit has a corresponding reference touch sensing circuit;
a first terminal of each to-sense touch sensing circuit receives a touch excitation signal (TX1), and a second terminal thereof applies the touch excitation signal (TX1) to a corresponding touch sensitive cell and receives a touch sensing signal from the corresponding touch sensitive cell, and an output terminal thereof outputs a first output signal;
a first terminal of each reference touch sensing circuit receives a touch reference signal (DC/TX2), and a second terminal thereof applies the touch reference signal (DC/TX2) to a corresponding touch sensitive cell and receives a reference sensing signal from the corresponding touch sensitive cell, and an output terminal thereof outputs a second output signal, wherein the touch reference signal (DC/TX2) and the touch excitation signal (TX1) are different signals; and
the plurality of operation units calculate, according to a first number of first output signals and a second number of second output signals, a differential signal between the output signals of each to-sense touch sensing circuit and its corresponding reference touch sensing circuit, the differential signal being associated with a capacitance difference of capacitances sensed by the to-sense touch sensing circuit and the corresponding reference touch sensing circuit,
wherein for each to-sense touch sensing circuit, the operation unit corresponding to the to-sense touch sensing circuit multiplies the second output signal output by its corresponding reference touch sensing circuit by a preset coefficient, and performs subtraction on the first output signal and the second output signal multiplied by the preset coefficient, to obtain the differential signal, wherein the preset coefficient is related to an area ratio between areas of contact pads of touch electrodes of the touch sensitive cells respectively corresponding to the to-sense touch sensing circuit and the corresponding reference touch sensing circuit.

11. The touch sensing apparatus according to claim 10, wherein the touch excitation signal received by the to-sense touch sensing circuit and the touch reference signal received by the corresponding reference touch sensing circuit are two variable signals with an only difference in amplitude, and
wherein, in a case where the two variable signals are different only in amplitude, a ratio of amplitudes of the two variable signals is related to a ratio between values of noise signals which the touch electrodes of the touch sensitive cells respectively corresponding to the to-sense touch sensing circuit and the corresponding reference touch sensing circuit are subjected to, or is related to the area ratio, or is related to both the ratio between values of noise signals and the area ratio.

12. A touch sensing apparatus for a touch panel, wherein the touch panel includes a plurality of touch sensitive cells, and the touch sensing apparatus include: a plurality of touch sensing circuits and a plurality of operation units in a one-to-one correspondence, wherein at least one touch sensing circuit of the plurality of touch sensing circuits is determined as at least one to-sense touch sensing circuit, and at least one touch sensing circuit of the plurality of touch sensing circuits is determined as at least one reference touch sensing circuit, wherein each touch sensing circuit has a corresponding touch sensitive cell, and each to-sense touch sensing circuit has a corresponding reference touch sensing circuit;
each to-sense touch sensing circuit transmits a touch excitation signal to a corresponding touch sensitive cell, and obtains at least one touch sensing signal;
each reference touch sensing circuit transmits a touch reference signal to a corresponding touch sensitive cell, and obtains at least one reference sensing signal, wherein the touch reference signal and the touch excitation signal are different signals, and
the plurality of operation units obtain at least one sensing signal according to the at least one reference sensing signal and the at least one touch sensing signal, wherein the at least one sensing signal is related to capacitance differences of capacitances sensed by the at least one to-sense touch sensing circuit and the at least one reference touch sensing circuit,
wherein, for each to-sense touch sensing circuit, the operation unit corresponding to the to-sense touch sensing circuit multiplies the reference touch signal by a preset coefficient, wherein the preset coefficient is related to an area ratio of an area of contact pad of the touch electrode or a relative area of a driving electrode and a sensing electrode as a touch electrode of the touch sensitive cell from which the touch sensing signal is obtained relative to an area of contact pad of or a relative area of a touch electrode of the touch sensitive cell from which the reference sensing signal is obtained; and
the operation unit corresponding to the to-sense touch sensing circuit performs subtraction on the touch sensing signal and the reference sensing signal multiplied by the preset coefficient, to obtain a differential signal, as one sensing signal.

13. The touch sensing apparatus according to claim 12, wherein,
the at least one to-sense touch sensing circuit corresponds to a same one reference touch sensing circuit, or,
the at least one to-sense touch sensing circuit corresponds to different reference touch sensing circuits.

14. The touch sensing apparatus according to claim 12, wherein the touch excitation signal is a first variable signal, and the touch reference signal is a direct current signal or a second variable signal different from the first variable signal.

15. The touch sensing apparatus according to claim 14, wherein each to-sense touch sensing circuit corresponds to the touch sensitive cells on one row or one column, and its corresponding reference touch sensing circuit corresponds to the touch sensitive cells on one row or one column.

16. The touch sensing apparatus according to claim 12, wherein the touch excitation signal transmitted to the touch sensitive cell from which the touch sensing signal is obtained and the touch reference signal transmitted to the touch sensitive cell from which the reference sensing signal is obtained are two variable signals with an only difference in amplitude, and wherein, in a case where the two variable signals are different only in amplitude, a ratio of amplitudes of the two variable signals is related to a ratio of values of noise signals that the touch sensitive cell from which the touch sensing signal is obtained and the touch sensitive cell from which the reference sensing signal is obtained are subjected to, or is related to the area ratio, or is related to both the ratio of values of noise signals and the area ratio.

\* \* \* \* \*